(12) United States Patent
Misra et al.

(10) Patent No.: US 11,782,760 B2
(45) Date of Patent: Oct. 10, 2023

(54) TIME-MULTIPLEXED USE OF RECONFIGURABLE HARDWARE

(71) Applicant: SambaNova Systems, Inc., Palo Alto, CA (US)

(72) Inventors: Anand Misra, Fremont, CA (US); Arnav Goel, San Jose, CA (US); Qi Zheng, Fremont, CA (US); Raghunath Shenbagam, San Jose, CA (US); Ravinder Kumar, Fremont, CA (US)

(73) Assignee: SambaNova Systems, Inc., Palo Alto, CA (US)

( * ) Notice: Subject to any disclaimer, the term of this patent is extended or adjusted under 35 U.S.C. 154(b) by 231 days.

(21) Appl. No.: 17/185,264

(22) Filed: Feb. 25, 2021

(65) Prior Publication Data

US 2022/0269534 A1    Aug. 25, 2022

(51) Int. Cl.
*G06F 9/46* (2006.01)
*G06F 9/48* (2006.01)
*G06F 9/38* (2018.01)

(52) U.S. Cl.
CPC .......... *G06F 9/4887* (2013.01); *G06F 9/3887* (2013.01)

(58) Field of Classification Search
CPC .............................. G06F 9/4887; G06F 9/3887
See application file for complete search history.

(56) References Cited

U.S. PATENT DOCUMENTS 5,684,980 A   11/1997  Casselman
6,470,485 B1  10/2002  Cote et al.
6,539,438 B1   3/2003  Ledzius et al.
6,667,983 B1  12/2003  Lo et al.
9,009,723 B2   4/2015  Degenaro et al.
(Continued)

FOREIGN PATENT DOCUMENTS

EP        1372084 A2    12/2003
JP     2020112901 A     7/2020
(Continued)

OTHER PUBLICATIONS

U.S. Appl. No. 17/379,921 Notice of Allowance dated Mar. 21, 2022, 25 pages.
(Continued)

*Primary Examiner* — Gregory A Kessler
(74) *Attorney, Agent, or Firm* — Flagship Patents; Sikander Khan; Bruce Young

(57) ABSTRACT

A method for executing applications in a system comprising general hardware and reconfigurable hardware includes accessing a first execution file comprising metadata storing a first priority indicator associated with a first application, and a second execution file comprising metadata storing a second priority indicator associated with a second application. In an example, use of the reconfigurable hardware is interleaved between the first application and the second application, and the interleaving is scheduled to take into account (i) workload of the reconfigurable hardware and (ii) the first priority indicator and the second priority indicator associated with the first application and the second application, respectively. In an example, when the reconfigurable hardware is used by one of the first and second applications, the general hardware is used by another of the first and second applications.

22 Claims, 13 Drawing Sheets

(56) References Cited

U.S. PATENT DOCUMENTS

| | | |
|---|---|---|
| 9,501,325 B2 | 11/2016 | Pell et al. |
| 10,511,479 B2 | 12/2019 | Xie et al. |
| 10,621,138 B2 | 4/2020 | Hu et al. |
| 10,802,870 B2 | 10/2020 | Lu |
| 10,831,507 B2 | 11/2020 | Shah et al. |
| 10,831,523 B2 | 11/2020 | Kochevar-Cureton et al. |
| 10,877,822 B1 | 12/2020 | Wang et al. |
| 11,080,227 B2 | 8/2021 | Koeplinger et al. |
| 11,182,221 B1 | 11/2021 | Sivaramakrishnan et al. |
| 11,182,264 B1 | 11/2021 | Sivaramakrishnan et al. |
| 11,184,439 B2 | 11/2021 | Eran et al. |
| 11,200,096 B1 | 12/2021 | Shenbagam et al. |
| 11,237,880 B1 | 2/2022 | Raumann et al. |
| 11,347,965 B2 | 5/2022 | Dutta et al. |
| 11,360,800 B2 | 6/2022 | Kochevar-Cureton et al. |
| 11,392,740 B2 | 7/2022 | Raumann et al. |
| 11,436,429 B2 | 9/2022 | Jaganathan et al. |
| 2002/0156998 A1 | 10/2002 | Casselman |
| 2003/0108119 A1 | 6/2003 | Mohebbi et al. |
| 2006/0012395 A1 | 1/2006 | Huppenthal et al. |
| 2006/0015712 A1 | 1/2006 | Ang et al. |
| 2007/0186126 A1 | 8/2007 | Smith et al. |
| 2007/0220522 A1 | 9/2007 | Coene et al. |
| 2008/0013448 A1 | 1/2008 | Horie et al. |
| 2009/0172351 A1 | 7/2009 | Vorbach et al. |
| 2009/0300209 A1 | 12/2009 | Elzur |
| 2014/0137123 A1 | 5/2014 | Hartmann et al. |
| 2014/0258438 A1 | 9/2014 | Ayoub |
| 2015/0058614 A1 | 2/2015 | Degenaro et al. |
| 2015/0100971 A1 | 4/2015 | Dube et al. |
| 2015/0106823 A1 | 4/2015 | Canoy et al. |
| 2016/0308719 A1 | 10/2016 | Putnam et al. |
| 2016/0314025 A1 | 10/2016 | McGarry et al. |
| 2016/0378550 A1* | 12/2016 | Bertran Monfort .. G06F 9/4843 718/102 |
| 2017/0220499 A1 | 8/2017 | Gray |
| 2017/0315815 A1 | 11/2017 | Smith et al. |
| 2017/0317679 A1 | 11/2017 | Suh et al. |
| 2018/0285295 A1 | 10/2018 | Abel et al. |
| 2018/0307950 A1 | 10/2018 | Nealis et al. |
| 2018/0308200 A1 | 10/2018 | Surti et al. |
| 2018/0314941 A1 | 11/2018 | Lie et al. |
| 2018/0315158 A1 | 11/2018 | Nurvitadhi et al. |
| 2019/0089616 A1 | 3/2019 | Chabbi et al. |
| 2019/0138890 A1 | 5/2019 | Liang et al. |
| 2019/0171604 A1 | 6/2019 | Brewer |
| 2019/0171612 A1 | 6/2019 | Shahar et al. |
| 2019/0180176 A1 | 6/2019 | Yudanov et al. |
| 2019/0258921 A1 | 8/2019 | Lie et al. |
| 2019/0286973 A1 | 9/2019 | Kovvuri et al. |
| 2019/0384642 A1 | 12/2019 | Bolkhovitin et al. |
| 2020/0090313 A1 | 3/2020 | Bugdary et al. |
| 2020/0142857 A1 | 5/2020 | Catiller et al. |
| 2020/0151573 A1 | 5/2020 | Das et al. |
| 2020/0174840 A1 | 6/2020 | Zhao et al. |
| 2020/0183745 A1* | 6/2020 | Ernst ..................... G06F 9/5005 |
| 2020/0226444 A1 | 7/2020 | Sharma et al. |
| 2020/0264876 A1 | 8/2020 | Lo et al. |
| 2020/0301898 A1 | 9/2020 | Samynathan et al. |
| 2020/0326992 A1 | 10/2020 | Jin et al. |
| 2020/0341930 A1 | 10/2020 | Cannata et al. |
| 2021/0011770 A1 | 1/2021 | Prabhakar et al. |
| 2021/0089343 A1 | 3/2021 | Hyoudou |
| 2021/0097366 A1 | 4/2021 | Wagner et al. |
| 2021/0097379 A1 | 4/2021 | Yang et al. |
| 2021/0103820 A1 | 4/2021 | Ghosh |
| 2021/0125058 A1 | 4/2021 | Chowdhury et al. |
| 2021/0192357 A1 | 6/2021 | Sinha et al. |
| 2021/0192358 A1 | 6/2021 | Song et al. |
| 2021/0200610 A1 | 7/2021 | Chu et al. |
| 2021/0241093 A1 | 8/2021 | Byrne et al. |
| 2022/0058034 A1 | 2/2022 | Grohoski et al. |
| 2022/0197714 A1 | 6/2022 | Raumann et al. |
| 2022/0198117 A1 | 6/2022 | Raumann et al. |
| 2022/0269534 A1 | 8/2022 | Misra et al. |
| 2022/0308935 A1 | 9/2022 | Shenbagam et al. |

FOREIGN PATENT DOCUMENTS

| | | |
|---|---|---|
| TW | 202240386 A | 10/2022 |
| TW | 202240394 A | 10/2022 |
| TW | 202248853 A | 12/2022 |
| WO | 2010142987 A1 | 12/2010 |
| WO | 2022133047 A1 | 6/2022 |
| WO | 2022182573 A1 | 9/2022 |
| WO | 2022203925 A1 | 9/2022 |

OTHER PUBLICATIONS

PCT/US2021/063733—International Search Report and Written Opinion, dated Apr. 4, 2022, 17 pages.

PCT/US2021/063728—International Search Report and Written Opinion, dated Apr. 4, 2022, 15 pages.

Galanis et al., Partitioning Methodology for Heterogeneous Reconfigurable Functional Units, The Journal of Supercomputing, vol. 38, No. 1, dated Oct. 1, 2006, 18 pages.

Galanis et al., A design flow for speeding-up dsp applications in heterogeneous reconfigurable systems, Microelectronics Journal, vol. 37, dated 2006, pp. 554-564, 11 pages.

Galanis et al., Accelerating Applications by Mapping Critical Kernels on Coarse-Grain Reconfigurable Hardware in Hybrid Systems, Field-Programmable Custom Computing Machines, 2005, 13th Annual IEEE Symposium on Napa, CA Apr. 2005, 2 pages.

PCT/US2022/020638—International Search Report and Written Opinion, dated Jun. 21, 2022, 17 pages.

PCT/US2022/016871—International Search Report and Written Opinion, dated Jun. 1, 2022, 14 pages.

Vucha et al., Dynamic Task Distribution Model for On-Chip Reconfigurable High Speed Computing System, Hindawi, dated Jun. 30, 2015, 13 pages.

Souissi et al., Optimization of Run-time Mapping on Heterogeneous CPU/FPGA Architecture, 9th International Conference of Modeling, Optimization and Simulation—MOSIM'12, Jun. 6-8, 2012, Bordeaux, France, 9 pages.

Fazlali et al., Efficient task scheduling for runtime reconfigurable systems, Journal of Systems Architecture, vol. 56, dated Jul. 26, 2010, pp. 623-632, 10 pages.

Mazur, A step by step backpropagation example, dated Mar. 17, 2015, 26 pages. Retrieved on Sep. 3, 2021. Retrieved from [URL: https://mattmazur.com/2015/03/17/a-step-by-step-backpropagation-example/ ].

Ekanayake, Model Parallelism in Deep Learning is Not What you think, dated Nov. 10, 2018, 4 pages. Retrieved on Sep. 3, 2021. Retrieved from [ URL: https://medium.com/@esaliya/model-parallelism-in-deep-learning-is-not-what-you-think-94d2f81e82ed ].

What is the difference between model paralellism and data paralellism, Quora, 14 pages. Retrieved on Sep. 3, 2021. Retrieved from [URL: https://www.quora.com/What-is-the-difference-between-model-parallelism-and-data-parallelism ].

Dettmers, How to Parallelize Deep Learning on GPUs Part 1 of 2: Data Parallelism, dated Oct. 9, 2014, 19 pages. Retrieved on Sep. 3, 2021. Retrieved from [URL: https://timdettmers.com/2014/10/09/deep-learning-data-parallelism/].

Dettmers, How to Parallelize Deep Learning on GPUs Part 2 of 2: Model Parallelism, dated Nov. 9, 2014, 19 pages. Retrieved on Sep. 3, 2021. Retrieved from [URL: https://timdettmers.com/2014/11/09/model-parallelism-deep-learning/ ].

U.S. Appl. No. 17/214,768 Notice of Allowance, dated Aug. 11, 2021, 26 pages.

Li, Ang, et al., "Evaluating Modern GPU Interconnect PCIe, NVLink, NV-SLI, NVSwitch and GPUDirect", Mar. 11, 2019, 15 pages.

NVIDIA, "NVIDIA Tesla P100", WP-08019-001 v01.1, 2016, 45 pages.

NVIDIA, "NVIDIA DGX-1 System Architecture", WP-08437-001_v02, 2017, 33 pages.

(56) References Cited

OTHER PUBLICATIONS

NVIDIA, "NVIDIA Turing GPU Architecture", WP-09183-001_v01, 2018, 86 pages.
NVIDIA, "NVIDIA DGX-1 With Tesla V100 System Architecture", WP-08437-002_v01,2017, 43 pages.
Prabhakar, et al., "Plasticine: A Reconfigurable Architecture For Parallel Patterns", pp. 389-402, IEEE, Jun. 24, 2017.
Koeplinger, et al., "Spatial A Language and Compiler for Application Accelerators", Jun. 18-22, 2018, 16pages.
U.S. Appl. No. 17/127,818—Office Action dated Apr. 1, 2021, 15 pages.
Ericles, Sousa, et al. "A Reconfigurable Memory Architecture for System Integration of Coarse-Grained Reconfigurable Arrays", 2017 International Conference on ReConFigurable Computing and FPGAs, Dec. 4-6, 2017, 8 pages.
U.S. Appl. No. 17/127,929—Office Action dated Apr. 1, 2021, 26 pages.
Kachris et al.; "A Survey on Reconfigurable Accelerators for Cloud Computing", IEEE 2016, Aug. 29, 2016, pp. 1-11.
Knodel, Oliver, et al., "RC3E: Reconfigurable Accelerators in Data Centers and their Provision by Adapted Service Models", IEEE 9th International Converence on Cloud Computing, 2016, pp. 1-8.
Marshall, Dave, "Remote Procedure Calls (RPC)", Jan. 5, 1999, 15 pages, Retreived from URL <https://users.cs.cf.ac.uk/Dave.Marshall/C/node33.html#SECTION 003300000000000000000>.
Jackson et. al., PCI Express Technology Comprehensive Guide to Generation 1.x, 2.x and 3.0, dated Jun. 2020, 1057 pages.
Tanaka et. al., Distributed Deep Learning with GPU-FPGA heterogenous computing, IEEE 2021, 9 pages.
Insujang, GPU Architecture Overview, Better Tomorrow with Computer Science, published Apr. 27, 2017, retrieved on Jun. 17, 2021, retrieved from the Internet [URL: https://insujang.github.io/2017-04-17/gpu-architecture-overview/].
Ruder, An overview of gradient descent optimization algorithms, NUI Galway Aylien Lyd, dated Jun. 15, 2017, 14 pages.
Zhang et. al., Dive into Deep Learning, Release 0.16.2, dated Mar. 20, 2021, 1027 pages.
Xiandong Qi, Introduction to Distributed Deep Learning, dated May 13, 2017, 13 pages.
Woolloy, NCCL: Accelerated Multi-GPU Collective Communications, NVIDIA, 56 pages.
Lecture 11: Distributed Training and Communication Protocols, CSE599W: Spring 2018, UW Paul G. Allen School of Computer Science and Engineering, 41 pages.
Accelerated Computing with a Reconfigurable Dataflow Architecture, SambaNova Systems Whitepaper, 10 pages.
Goodfellow et. al., Deep Learning Book Chapter 6 Deep Feedforward Networks, 2016, 60 pages.
Strom, Scalable Distributed DNN Training Using Commodity GPU Cloud Computing, Amazon.com, 5 pages.
Mao, Data Parallelism vs Model Parallelism in Distributed Deep Learning Training, dated Mar. 23, 2019, 4 pages, retrieved on Mar. 30, 2021, Retrieved from the internet [URL: https://leimao.github.io].
Donges, Gradient Descent: An Introduction to Machine Learning's Most Popular Algorithms, dated Jun. 16, 2019, 10 pages. Retrieved on Mar. 24, 2021, retrieved from [URL: https://builtin.com/data-science/gradient-descent].
Jin et. al., How to scale distributed deep learning, dated Nov. 14, 2016, 16 pages.
Podobas et al., A Survey on Coarse-Grained Reconfigurable Architectures From a Performance Perspective, IEEEAccess, vol. 2020. 3012084, Jul. 27, 2020, 25 pages.
M. Emani et al., "Accelerating Scientific Applications With SambaNova Reconfigurable Dataflow Architecture," in Computing in Science & Engineering, vol. 23, No. 2, pp. 114-119, 1 Mar.-Apr. 2021, doi: 10.1109/MCSE.2021.3057203.
U.S. Appl. No. 17/127,818 Notice of Allowance, dated Jul. 21, 2021, 10 pages.
U.S. Appl. No. 17/127,929 Notice of Allowance, dated Jul. 21, 2021, 14 pages.
Liu et al., Offloading distributed Applications onto SmartNICs using iPipe, ACM 2019, pp. 1-16.
U.S. Appl. No. 17/379,921 Notice of Allowance, dated Nov. 26, 2021, 34 pages.
Busa et al., A Run-Time World-Level Reconfigurable Coarse-Grain Functional Unit for a VLIW Processor, ACM, dated 2002, 6 pages.
Jafri et al., NeuroCGRA: A CGRA with support for Neural Networks, IEEE, dated 2014, 6 pages.
Rubattu et al., Dataflow-Functional High-Level Synthesis for Coarse-Grained Reconfigurable Accelerators, IEEE Embedded Systems Letters, vol. 11, No. 3, dated Sep. 2019, 4 pages.
U.S. Appl. No. 17/127,818—Response to Office Action dated Apr. 1, 2021, filed Jul. 1, 2021, 15 pages.
U.S. Appl. No. 17/127,929—Response to Office Action dated Apr. 1, 2021, filed Jul. 1, 2021, 10 pages.
U.S. Appl. No. 17/214,768 Supplemental Notice of Allowance, dated Aug. 25, 2021, 10 pages.
Bae et al., "Auto-tuning CNNs for coarse-grained reconfigurable array-based accelerators"; IEEE 2018 (Bae_2018.pdf; pp. 1-10) (Year: 2018).
Li et al., "CATERPILLAR: coarse grain reconfigurable architecture for accelerating the training of deep neural networks"; IEEE 2017 (Li_2017.pdf; pp. 1-10) (Year: 2017).
Ma et al.; "DeepGauge: Multi-Granularity Testing Criteria for Deep Learning Systems"; ACM 2018 (Ma_2018.pdf; pp. 1-12) (Year: 2018).
U.S. Appl. No. 17/379,924 Notice of Allowance, dated Sep. 16, 2021, 51 pages.
Iqbal et al., Reconfigurable Processor Architecture for High Speed Applications, IEEE, dated 2009, pp. 624-629.
Liang et al., Dynamic Coarse Grain Dataflow Reconfiguration Technique for Real-Time Systems, IEEE, dated 2005, pp. 3511-3514.
Padole et al., Configuration Memory Based Dynamic Coarse Grained Reconfigurable Multiscore Architecture, IEEE 2013, pp. 3511-3514, 5 pages.
Paek et al., "Binary Acceleration Using Coarse-Grained Reconfigurable Architecture," ACM SIGARCH Computer Architecture News, vol. 38, No. 4, Sep. 2010, 7 pages.
U.S. Appl. No. 17/522,682—Supplemental Notice of Allowance, dated Jan. 24, 2023, 2 pages.
U.S. Appl. No. 17/522,655—Notice of Allowance, dated Nov. 16, 2022, 21 pages.
U.S. Appl. No. 17/522,658—Notice of Allowance, dated Dec. 14, 2022, 22 pages.
U.S. Appl. No. 17/522,682—Notice of Allowance, dated Jan. 11, 2023, 23 pages.

* cited by examiner

TIME-MULTIPLEXED USE OF RECONFIGURABLE HARDWARE

FIELD OF THE TECHNOLOGY DISCLOSED

The present technology relates to reconfigurable architectures, can be particularly applied to time-multiplexed use of reconfigurable hardware.

INCORPORATIONS

The following are incorporated by reference for all purposes as if fully set forth herein:

Prabhakar et al., "Plasticine: A Reconfigurable Architecture for Parallel Patterns," ISCA '17, Jun. 24-28, 2017, Toronto, ON, Canada;

Koeplinger et al., "Spatial: A Language And Compiler For Application Accelerators," *Proceedings Of The 39th ACM SIGPLAN Conference On Programming Language Design And Implementation* (PLDI), Proceedings of the 43rd International Symposium on Computer Architecture, 2018;

U.S. Non-provisional patent application Ser. No. 16/239, 252, filed Jan. 3, 2019, entitled, "VIRTUALIZATION OF A RECONFIGURABLE DATA PROCESSOR," which is now issued as U.S. Pat. No. 10,698,853 issued on Jun. 30, 2020;

U.S. Non-provisional patent application Ser. No. 16/197, 826, filed Nov. 21, 2018, entitled, "CONFIGURATION LOAD OF A RECONFIGURABLE DATA PROCESSOR," which is now issued as U.S. Pat. No. 10,831,507 issued on Nov. 10, 2020;

U.S. Non-provisional patent application Ser. No. 16/198, 086, filed Nov. 21, 2018, entitled, "CONFIGURATION UNLOAD OF A RECONFIGURABLE DATA PROCESSOR";

U.S. Non-provisional patent application Ser. No. 16/260, 548, filed Jan. 29, 2019, entitled, "MATRIX NORMAL/TRANSPOSE READ AND A RECONFIGURABLE DATA PROCESSOR INCLUDING SAME," which is now issued as U.S. Pat. No. 10,768,899 issued on Sep. 8, 2020;

U.S. Non-provisional patent application Ser. No. 16/536, 192, filed Aug. 8, 2019, entitled, "COMPILER FLOW LOGIC FOR RECONFIGURABLE ARCHITECTURES" ;

U.S. Non-provisional patent application Ser. No. 16/407, 675, filed May 9, 2019, entitled, "CONTROL FLOW BARRIER AND RECONFIGURABLE DATA PROCESSOR" ;

U.S. Non-provisional patent application Ser. No. 16/504, 627, filed Jul. 8, 2019, entitled, "QUIESCE RECONFIGURABLE DATA PROCESSOR";

U.S. Non-provisional patent application Ser. No. 16/572, 516, filed Sep. 16, 2019, entitled, "EFFICIENT EXECUTION OF OPERATION UNIT GRAPHS ON RECONFIGURABLE ARCHITECTURES BASED ON USER SPECIFICATION";

U.S. Non-provisional patent application Ser. No. 16/744, 077, filed Jan. 15, 2020, entitled, "COMPUTATIONALLY EFFICIENT SOFTMAX LOSS GRADIENT BACKPROPAGATION";

U.S. Non-provisional patent application Ser. No. 16/590, 058, filed Oct. 1, 2019, entitled, "COMPUTATION UNITS FOR FUNCTIONS BASED ON LOOKUP TABLES";

U.S. Non-provisional patent application Ser. No. 16/695, 138, filed Nov. 25, 2019, entitled, "COMPUTATIONAL UNITS FOR BATCH NORMALIZATION";

U.S. Non-provisional patent application Ser. No. 16/688, 069, filed Nov. 19, 2019, entitled, "LOOK-UP TABLE WITH INPUT OFFSETTING";

U.S. Non-provisional patent application Ser. No. 16/718, 094, filed Dec. 17, 2019, entitled, "COMPUTATIONAL UNITS FOR ELEMENT APPROXIMATION";

U.S. Non-provisional patent application Ser. No. 16/560, 057, filed Sep. 4, 2019, entitled, "SIGMOID FUNCTION IN HARDWARE AND A RECONFIGURABLE DATA PROCESSOR INCLUDING SAME";

U.S. Non-provisional patent application Ser. No. 16/572, 527, filed Sep. 16, 2019, entitled, "PERFORMANCE ESTIMATION-BASED RESOURCE ALLOCATION FOR RECONFIGURABLE ARCHITECTURES";

U.S. Non-provisional patent application Ser. No. 15/930, 381, filed May 12, 2020, entitled, "COMPUTATIONALLY EFFICIENT GENERAL MATRIX-MATRIX MULTIPLICATION (GeMM)";

U.S. Non-provisional patent application Ser. No. 16/890, 841, filed Jun. 2, 2020, entitled, "ANTI-CONGESTION FLOW CONTROL FOR RECONFIGURABLE PROCESSORS";

U.S. Non-provisional patent application Ser. No. 16/922, 975, filed Jul. 7, 2020, entitled, "RUNTIME VIRTUALIZATION OF RECONFIGURABLE DATA FLOW RESOURCES";

U.S. Non-provisional patent application Ser. No. 16/996, 666, filed Aug. 18, 2020, entitled, "RUNTIME PATCHING OF CONFIGURATION FILES";

U.S. Non-provisional patent application Ser. No. 17/023, 015, filed Sep. 16, 2020, "COMPILE TIME LOGIC FOR DETECTING STREAMING COMPATIBLE AND BROADCAST COMPATIBLE DATA ACCESS PATTERNS" ; and U.S. Non-provisional patent application Ser. No. 17/031, 679, filed Sep. 24, 2020, "SYSTEMS AND METHODS FOR MEMORY LAYOUT DETERMINATION AND CONFLICT RESOLUTION".

BACKGROUND

Reconfigurable processors can be configured to implement a variety of functions more efficiently or faster than might be achieved using a general-purpose processor executing a computer program. So called Coarse-Grain Reconfigurable Architectures (e.g., CGRAs) are being developed in which the configurable units in the array are more complex than those used in typical, more fine-grained Field-Programmable Gate Arrays (FPGAs), and may enable faster or more efficient execution of various classes of functions. For example, CGRAs have been proposed that can enable implementation of energy-efficient accelerators for machine learning and artificial intelligence workloads. See, Prabhakar, et al., "Plasticine: A Reconfigurable Architecture for Parallel Patterns," ISCA '17, Jun. 24-28, 2017, Toronto, ON, Canada.

A reconfigurable architecture system may include general-purpose non-reconfigurable hardware, as well as reconfigurable hardware resources that can be reconfigured to suit a need of a specific application being executed in the reconfigurable hardware. In an example, certain portions of an application program are executed in the general-purpose hardware, and other portions of the application program are executed in the reconfigurable hardware. When portions of an application are being executed in the general-purpose hardware, the reconfigurable hardware can be idle. Similarly, when other portions of the application are being executed in the reconfigurable hardware, the general-purpose hardware can be idle. This may result in underutilization of hardware resources in the reconfigurable architecture system.

In order to maximize operating efficiency, it may be desirable to time-multiplex programs on the reconfigurable architecture system.

DETAILED DESCRIPTION

The following description will typically be with reference to specific structural embodiments and methods. It is to be understood that there is no intention to limit the technology to the specifically disclosed embodiments and methods but that the technology may be practiced using other features, elements, methods and embodiments. Preferred embodiments are described to illustrate the present technology, not to limit its scope, which is defined by the claims. Those of ordinary skill in the art will recognize a variety of equivalent variations on the description that follows.

Elements referred to herein with a common reference label followed by a particular number or alphabet may be collectively referred to by the reference label alone. For example, configuration files 613_1, . . . , 613_N (illustrated in FIG. 7) may be collectively and generally referred to as configuration files 613 in plural, and configuration file 613 in singular.

Figure 1:
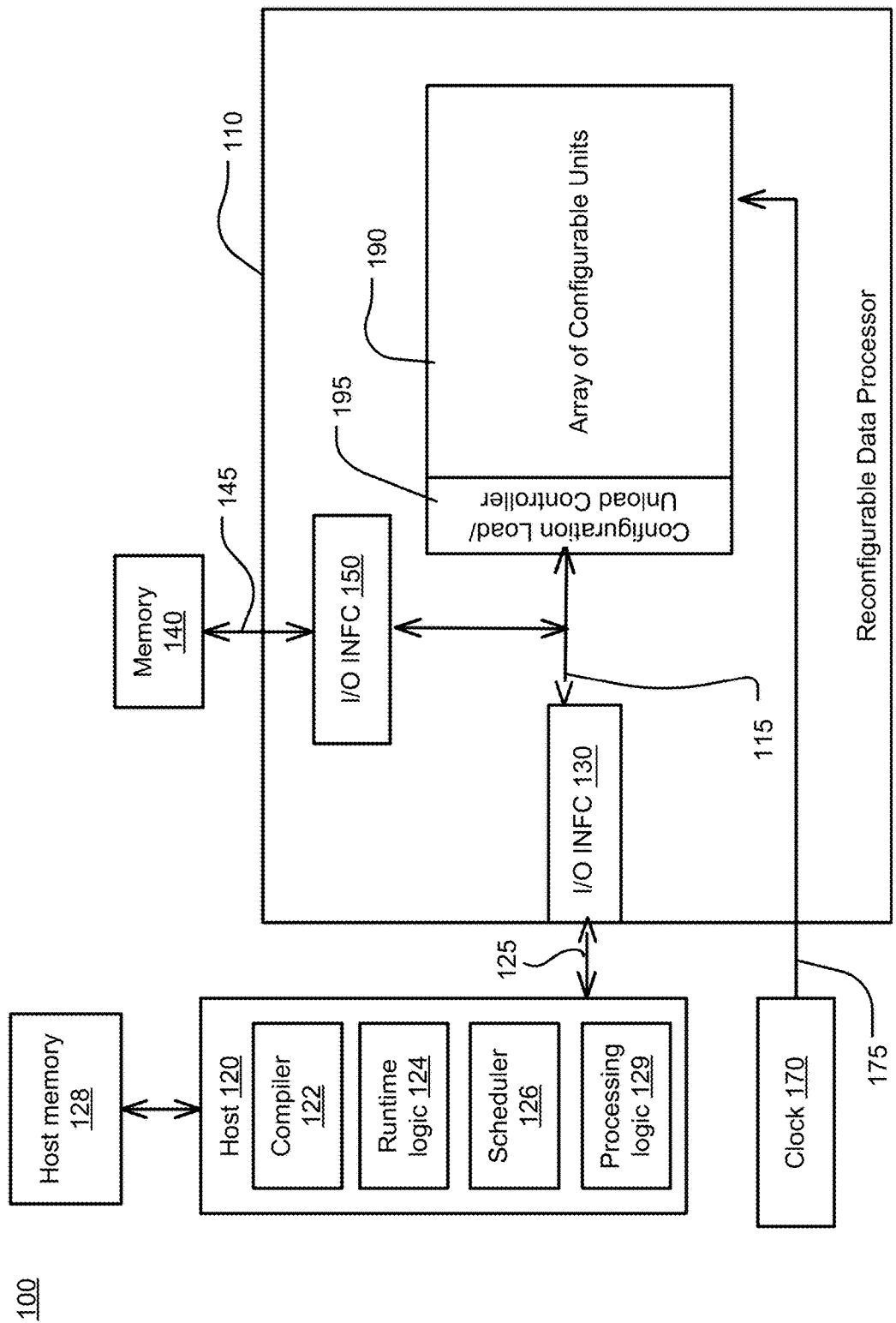
FIG. 1 is a system diagram illustrating a system including a host, a memory, and a reconfigurable data processor.

FIG. 1 is a system diagram illustrating a system including a host 120, a memory 140, and a reconfigurable data processor 110. In an example, the host 120, unlike the reconfigurable data processor 110, cannot be reconfigured based on the application program being executed on the host 120. Accordingly, the host 120 is also referred to as non-reconfigurable general-purpose hardware, or simple as general hardware. Thus, the term "general hardware" implies that such hardware resources are not configurable to suit needs of a program being executed thereon.

In contrast, the reconfigurable data processor 110 and one or more reconfigurable components therewithin (e.g., an array 190 of configurable units) are referred to as "reconfigurable hardware", as the reconfigurable data processor 110 and the one or more components therewithin are configurable and reconfigurable to suit needs of a program being executed thereon, as will be discussed herein in further detail in turn.

As shown in the example of FIG. 1, the host 120 executes a compiler 122 to compile applications, and a runtime logic 124 to execute the compiled applications on the reconfigurable data processor 110. For example, the compiler 122 compiles a high-level application and generates one or more corresponding execution files, where the execution files include configuration files or bit files (the terms configuration file and bit file are used interchangeably here). The runtime logic 124 is configured to load and execute the one or more configuration files on the reconfigurable data processor 110. The reconfigurable data processor 110 is configured to process the configuration files and generate corresponding outputs.

As shown in the example of FIG. 1, the reconfigurable data processor 110 includes the array 190 of configurable units and a configuration load/unload controller 195. The phrase "configuration load/unload controller", as used herein, refers to a combination of a configuration load controller and a configuration unload controller. The configuration load controller and the configuration unload controller may be implemented using separate logic and data path resources, or may be implemented using shared logic and data path resources as suits a particular embodiment. In some embodiments, a system may include only a configuration load controller of the types described herein. In some embodiments, a system may include only a configuration unload controller of the types described herein.

The processor 110 includes an external I/O interface 130 connected to the host 120, and external I/O interface 150 connected to the memory 140. The I/O interfaces 130, 150 connect via a bus system 115 to the array 190 of configurable units and to the configuration load/unload controller 195. The bus system 115 may have a bus width of carrying one chunk of data, which can be for this example 128 bits (references to 128 bits throughout can be considered as an example chunk size more generally). In general, a chunk of the configuration file can have a number N of bits of data, and the bus system can be configured to transfer N bits of data in one bus cycle, where N is any practical bus width. A sub-file distributed in the distribution sequence can consist of one chunk, or other amounts of data as suits a particular embodiment. Procedures are described herein using sub-files consisting of one chunk of data each. Of course, the technology can be configured to distribute sub-files of different sizes, including sub-files that may consist of two chunks distributed in two bus cycles for example.

To configure configurable units in the array 190 of configurable units with a configuration file, the host 120 can send the configuration file to the memory 140 via the interface 130, the bus system 115, and the interface 150 in the reconfigurable data processor 110. The configuration file can be loaded in many ways, as suits a particular architecture, including in data paths outside the reconfigurable data processor 110. The configuration file can be retrieved from the memory 140 via the memory interface 150. Chunks of the configuration file can then be sent in a distribution sequence as described herein to configurable units in the array 190 of configurable units in the reconfigurable data processor 110.

The host 120 also executes a scheduler 126, which schedules interleaved sharing of general hardware (such as the host 120) and the reconfigurable hardware (such as reconfigurable data processor 110) among two or more applications, as will be discussed herein in further detail in turn.

The host 120 also executes processing logic 129, which performs operations when executing an application. For example, assume that an application to be executed in the system 100 has to pre-process data by the host 120, prior to the data being processed by the reconfigurable data processor 110. In an embodiment, the processing logic 129 within the host 120 preprocesses the data of the application.

In an example, the memory 140 is within a chip that is different from a chip comprising the reconfigurable data processor 110, and hence, the memory 140 is referred to herein as an off-chip memory. Similarly, the memory 128 is within a chip that is different from a chip comprising the reconfigurable data processor 110, and hence, the memory 128 is also referred to herein as an off-chip memory. Thus, off-chip memory refers to the memory 140 and/or the memory 128, in some examples. In contrast, the reconfigurable array of units 190 comprises configurable memory units (such as PMUs illustrated in FIGS. 3 and 5), which are referred to herein as on-chip memory.

An external clock generator 170 or other clock signal sources can provide a clock signal 175 or clock signals to elements in the reconfigurable data processor 110, including the array 190 of configurable units, and the bus system 115, and the external data I/O interfaces.

Figure 2:
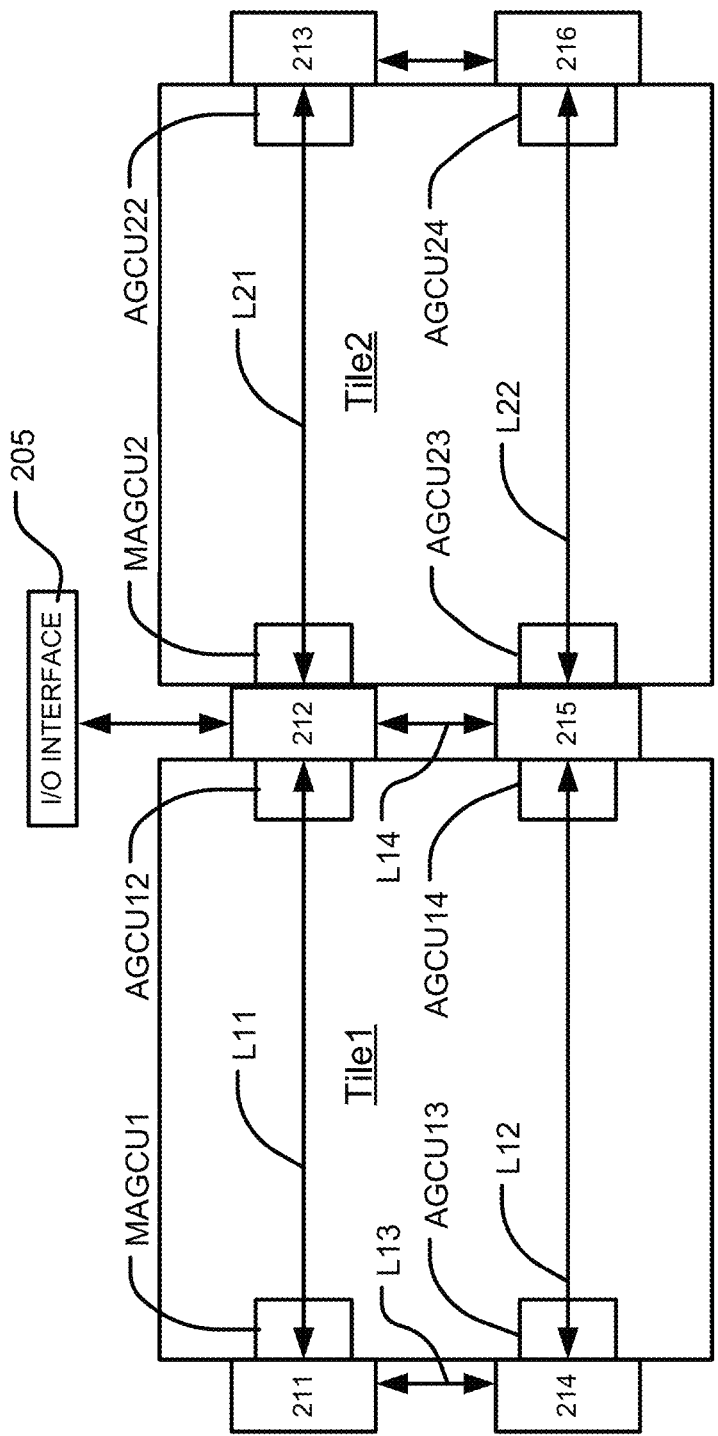
FIG. 2 is a simplified block diagram of a top level network and components of a CGRA (Coarse Grain Reconfigurable Architecture).

FIG. 2 is a simplified block diagram of components of a CGRA (Coarse Grain Reconfigurable Architecture) processor. In this example, the CGRA processor has 2 tiles (Tile1, Tile2). The tile comprises an array of configurable units connected to a bus system, including an array level network in this example. The bus system includes a top level network connecting the tiles to external I/O interface 205 (or any number of interfaces). In other embodiments, different bus system configurations may be utilized. The configurable units in each tile are nodes on the array level network in this embodiment.

Each of the four tiles has 4 AGCUs (Address Generation and Coalescing Units) (e.g., MAGCU1, AGCU12, AGCU13, AGCU14). The AGCUs are nodes on the top level network and nodes on the array level networks, and include resources for routing data among nodes on the top level network and nodes on the array level network in each tile.

Nodes on the top level network in this example include one or more external I/O interfaces, including interface 205. The interfaces to external devices include resources for routing data among nodes on the top level network and external devices, such as high-capacity memory, host processors, other CGRA processors, FPGA devices and so on, that are connected to the interfaces.

One of the AGCUs in a tile is configured in this example to be a master AGCU (MAGCU), which includes an array configuration load/unload controller for the tile. In other embodiments, more than one array configuration load/unload controller can be implemented and one array configuration load/unload controller may be implemented by logic distributed among more than one AGCU.

The MAGCU1 includes a configuration load/unload controller for Tile1, and MAGCU2 includes a configuration load/unload controller for Tile2. In other embodiments, a configuration load/unload controller can be designed for loading and unloading configuration of more than one tile. In other embodiments, more than one configuration controller can be designed for configuration of a single tile. Also, the configuration load/unload controller can be implemented in other portions of the system, including as a stand-alone node on the top level network and the array level network or networks.

The top level network is constructed using top level switches (211-216) connecting to each other as well as to other nodes on the top level network, including the AGCUs, and I/O interface 205. The top level network includes links (e.g., L11, L12, L21, L22) connecting the top level switches. Data travel in packets between the top level switches on the links, and from the switches to the nodes on the network connected to the switches. For example, top level switches 211 and 212 are connected by a link L11, top level switches 214 and 215 are connected by a link L12, top level switches 211 and 214 are connected by a link L13, and top level switches 212 and 213 are connected by a link L21. The links can include one or more buses and supporting control lines, including for example a chunk-wide bus (vector bus). For example, the top level network can include data, request and response channels operable in coordination for transfer of data in a manner analogous to an AXI compatible protocol. See, AMBA® AXI and ACE Protocol Specification, ARM, 2017.

Top level switches can be connected to AGCUs. For example, top level switches 211, 212, 214 and 215 are connected to MAGCU1, AGCU12, AGCU13 and AGCU14 in the tile Tile1, respectively. Top level switches 212, 213, 215 and 216 are connected to MAGCU2, AGCU22, AGCU23 and AGCU24 in the tile Tile2, respectively.

Top level switches can be connected to one or more external I/O interfaces (e.g., interface 205).

Figure 3A:
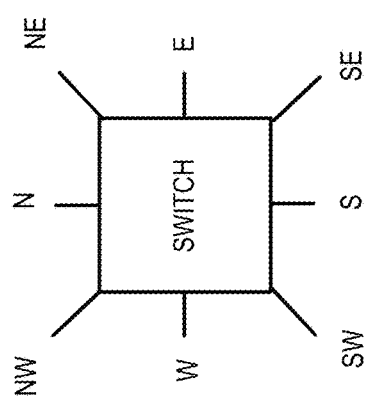
FIG. 3A illustrates an example switch unit connecting elements in an array level network.
Figure 3:
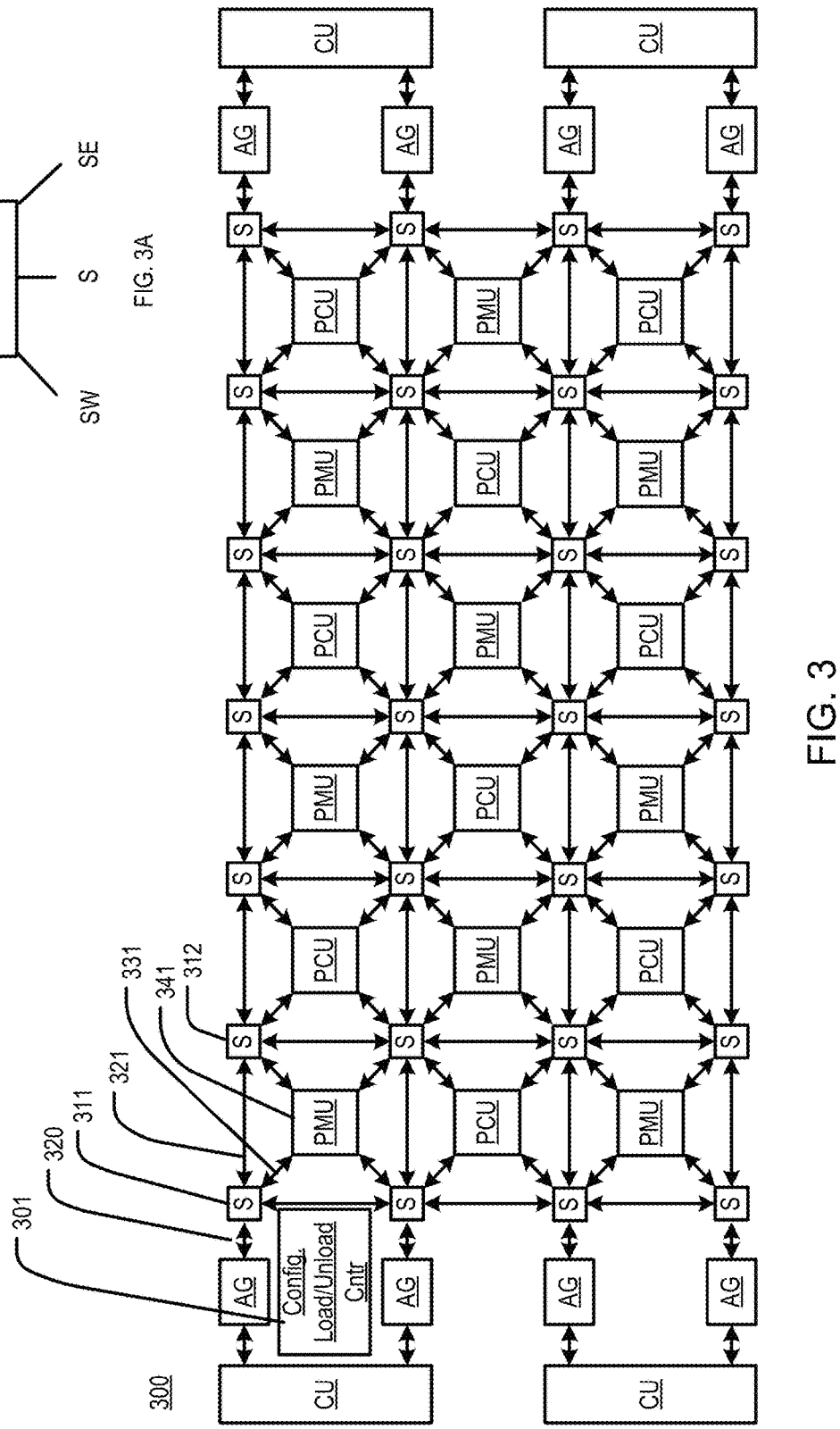
FIG. 3 is a simplified diagram of a tile and an array level network usable in the configuration of FIG. 2, where the configurable units in the array are nodes on the array level network.

FIG. 3 is a simplified diagram of a tile and an array level network usable in the configuration of FIG. 2, where the configurable units in the array are nodes on the array level network.

In this example, the array of configurable units 300 includes a plurality of types of configurable units. The types of configurable units in this example, include Pattern Compute Units (PCU), Pattern Memory Units (PMU), switch units (S), and Address Generation and Coalescing Units (each including two address generators AG and a shared CU). For an example of the functions of these types of configurable units, see, Prabhakar et al., "Plasticine: A Reconfigurable Architecture For Parallel Patterns", ISCA '17, Jun. 24-28, 2017, Toronto, ON, Canada, which is incorporated by reference as if fully set forth herein. Each of these configurable units contains a configuration store comprising a set of registers or flip-flops that represent either the setup or the sequence to run a program, and can include the number of nested loops, the limits of each loop iterator, the instructions to be executed for each stage, the source of the operands, and the network parameters for the input and output interfaces.

Additionally, each of these configurable units contains a configuration store comprising a set of registers or flip-flops that store status usable to track progress in nested loops or otherwise. A configuration file contains a bit-stream representing the initial configuration, or starting state, of each of the components that execute the program. This bit-stream is referred to as a bit-file. Program load is the process of setting up the configuration stores in the array of configurable units based on the contents of the bit file to allow all the components to execute a program (i.e., a machine). Program Load may also require the load of all PMU memories.

The array level network includes links interconnecting configurable units in the array. The links in the array level network include one or more and, in this case three, kinds of physical buses: a chunk-level vector bus (e.g., 128 bits of data), a word-level scalar bus (e.g., 32 bits of data), and a multiple bit-level control bus. For instance, interconnect 321 between switch units 311 and 312 includes a vector bus interconnect with vector bus width of 128 bits, a scalar bus interconnect with a scalar bus width of 32 bits, and a control bus interconnect.

The three kinds of physical buses differ in the granularity of data being transferred. In one embodiment, the vector bus can carry a chunk that includes 16-Bytes (=128 bits) of data as its payload. The scalar bus can have a 32-bit payload, and carry scalar operands or control information. The control bus can carry control handshakes such as tokens and other signals. The vector and scalar buses can be packet switched, including headers that indicate a destination of each packet and other information such as sequence numbers that can be used to reassemble a file when the packets are received out of order. Each packet header can contain a destination identifier that identifies the geographical coordinates of the destination switch unit (e.g., the row and column in the array), and an interface identifier that identifies the interface on the destination switch (e.g., North, South, East, West, etc.) used to reach the destination unit. The control network can be circuit switched based on timing circuits in the device, for example. The configuration load/unload controller can generate a header for each chunk of configuration data of 128 bits. The header is transmitted on a header bus to each configurable unit in the array of configurable unit.

In one example, a chunk of data of 128 bits is transmitted on the vector bus that provides the chunk as vector inputs to a configurable unit. The vector bus can include 128 payload lines, and a set of header lines. The header can include a sequence ID for each chunk, which can include:

A bit to indicates if the chunk is scratchpad memory or configuration store data.

Bits that form a chunk number.

Bits that indicate a column identifier.

Bits that indicate a row identifier.

Bits that indicate a component identifier.

For a load operation, the configuration load controller can send the number N of chunks to a configurable unit in order from N−1 to 0. For this example, the 6 chunks are sent out in the most significant bit first order of Chunk 5→Chunk 4→Chunk 3→Chunk 2→Chunk 1→Chunk 0. (Note that this most significant bit first order results in Chunk 5 being distributed in round 0 of the distribution sequence from the array configuration load controller.) For an unload operation, the configuration unload controller can write the unload data out of order to the memory. For both load and unload operations, the shifting in the configuration serial chains in a configuration data store in a configurable unit is from LSB (least-significant-bit) to MSB (most-significant-bit), or MSB out first. Further detail of the load and unload process can be found in U.S. Non-provisional patent application Ser. No. 16/197,826, filed Nov. 21, 2018, entitled, "CONFIGURATION LOAD OF A RECONFIGURABLE DATA PROCES-SOR," which is now issued as U.S. Pat. No. 10,831,507 issued on Nov. 10, 2020; and in U.S. Non-provisional patent application Ser. No. 16/198,086, filed Nov. 21, 2018, entitled, "CONFIGURATION UNLOAD OF A RECONFIGURABLE DATA PROCESSOR," each of which are incorporated by reference for all purposes as if fully set forth herein.

FIG. 3A illustrates an example switch unit connecting elements in an array level network. As shown in the example of FIG. 3A, a switch unit can have 8 interfaces. The North, South, East and West interfaces of a switch unit are used for connections between switch units. The Northeast, Southeast, Northwest and Southwest interfaces of a switch unit are each used to make connections to PCU or PMU instances.

In an example, the switch unit is configurable. For example, when a first configuration file is being executed, the switch unit can interconnect a first PCU with a first PMU (e.g., such that the first PCU stores data in the first PMU). On the other hand, when a second configuration file is being executed, the same switch unit can interconnect the first PCU with a second PMU (e.g., such that the first PCU stores data in the second PMU).

A set of 2 switch units in each tile quadrant have connections to an Address Generation and Coalescing Unit (AGCU) that include multiple Address Generation (AG) units and a Coalescing Unit (CU) connected to the multiple address generation units. The Coalescing Unit (CU) arbitrates between the AGs and processes memory requests. Each of the 8 interfaces of a switch unit can include a vector interface, a scalar interface, and a control interface to communicate with the vector network, the scalar network, and the control network.

During execution of a machine after configuration, data can be sent via one or more unit switches and one or more links between the unit switches to the configurable units using the vector bus and vector interface(s) of the one or more switch units on the array level network.

In embodiments described herein, a configuration file or bit file, before configuration of the tile, can be sent from the configuration load controller using the same vector bus, via one or more unit switches and one or more links between the unit switches to the configurable unit using the vector bus and vector interface(s) of the one or more switch units on the array level network. For instance, a chunk of configuration data in a unit file particular to a configurable unit PMU 341 can be sent from the configuration load/unload controller 301 to the PMU 341, via a link 320 between the configuration load/unload controller 301 and the West (W) vector interface of the switch unit 311, the switch unit 312, and a link 331 between the Southeast (SE) vector interface of the switch unit 311 and the PMU 341.

Figure 4:
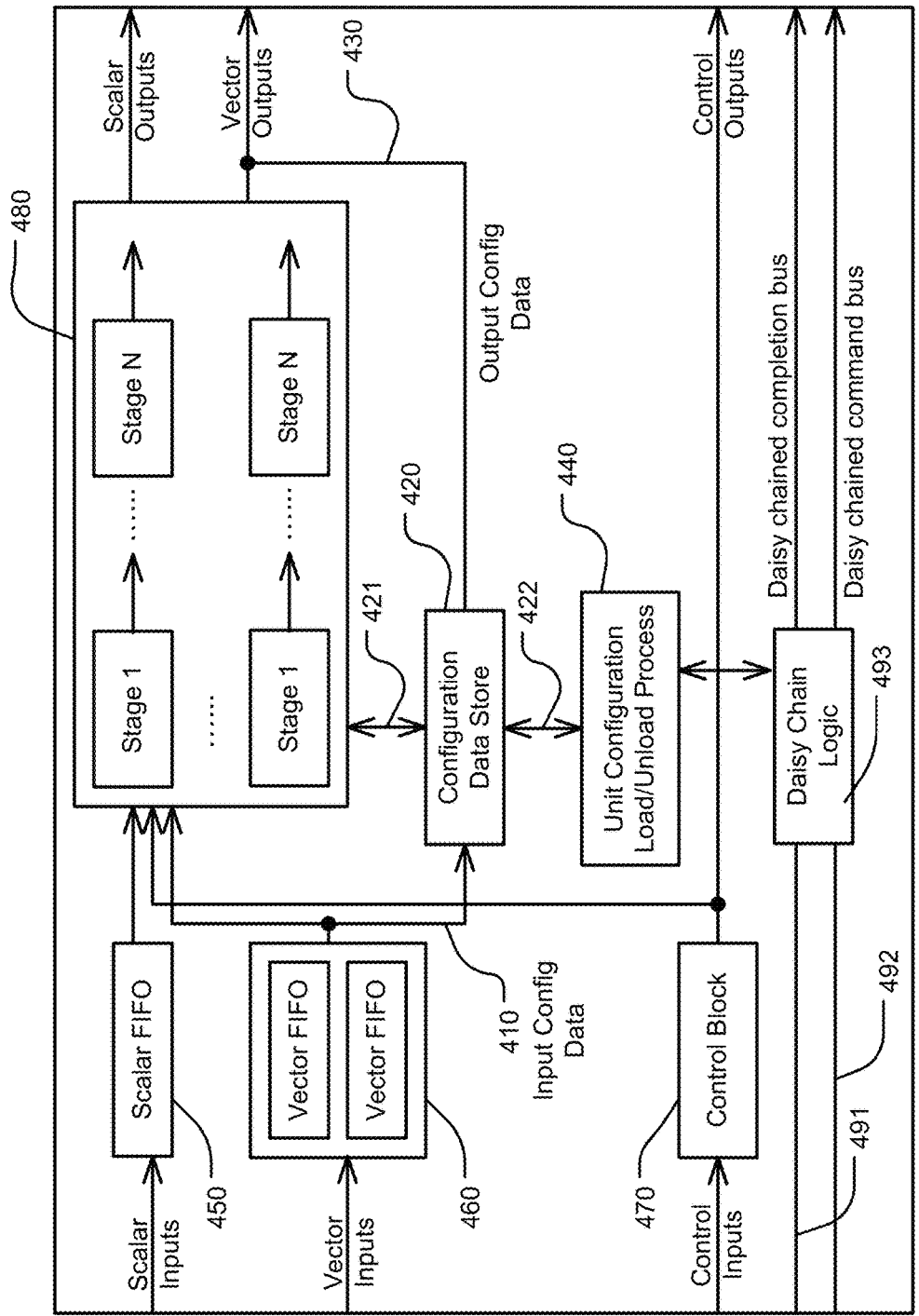
FIG. 4 is a block diagram illustrating an example configurable unit, such as a Pattern Compute Unit (PCU).

In this example, one of the AGCUs is configured to be a master AGCU, which includes a configuration load/unload controller (e.g., 301). The master AGCU implements a register through which the host (120, FIG. 1) can send commands via the bus system to the master AGCU. The master AGCU controls operations on an array of configurable units in a tile and implements a program control state machine to track the state of the tile based on the commands it receives from the host through writes to the register. For every state transition, the master AGCU issues commands to all components on the tile over a daisy chained command bus (FIG. 4). The commands include a program reset command to reset configurable units in an array of configurable units in a tile, and a program load command to load a configuration file to the configurable units.

The configuration load controller in the master AGCU is responsible for reading the configuration file from the memory and sending the configuration data to every configurable unit of the tile. The master AGCU can read the configuration file from the memory at preferably the maximum throughput of the top level network. The data read from memory are transmitted by the master AGCU over the vector interface on the array level network to the corresponding configurable unit according to a distribution sequence described herein.

In one embodiment, in a way that can reduce the wiring requirements within a configurable unit, configuration and status registers holding unit files to be loaded in a configuration load process, or unloaded in a configuration unload process in a component are connected in a serial chain and can be loaded through a process of shifting bits through the serial chain. In some embodiments, there may be more than one serial chain arranged in parallel or in series. When a configurable unit receives for example 128 bits of configuration data from the master AGCU in one bus cycle, the configurable unit shifts this data through its serial chain at the rate of 1 bit per cycle, where shifter cycles can run at the same rate as the bus cycle. It will take 128 shifter cycles for a configurable unit to load 128 configuration bits with the 128 bits of data received over the vector interface. The 128 bits of configuration data are referred to as a chunk. A configurable unit can require multiple chunks of data to load all its configuration bits.

The configurable units interface with the memory through multiple memory interfaces (150, FIG. 1). Each of the memory interfaces can be accessed using several AGCUs. Each AGCU contains a reconfigurable scalar datapath to generate requests for the off-chip memory. Each AGCU contains FIFOs (first-in-first-out buffers for organizing data) to buffer outgoing commands, data, and incoming responses from the off-chip memory.

The address generators AGs in the AGCUs can generate memory commands that are either dense or sparse. Dense requests can be used to bulk transfer contiguous off-chip memory regions, and can be used to read or write chunks of data from/to configurable units in the array of configurable units. Dense requests can be converted to multiple off-chip memory burst requests by the coalescing unit (CU) in the AGCUs. Sparse requests can enqueue a stream of addresses into the coalescing unit. The coalescing unit uses a coalescing cache to maintain metadata on issued off-chip memory requests and combines sparse addresses that belong to the same off-chip memory request to minimize the number of issued off-chip memory requests.

FIG. 4 is a block diagram illustrating an example configurable unit 400, such as a Pattern Compute Unit (PCU), which is configured based on configuration files corresponding to one or more applications. For example, a first configuration file corresponding to a first application can configure the PCU 400 in a first configuration when the first configuration file is being executed by the reconfigurable data processor 110, and a second configuration file corresponding to a second application can configure the PCU 400 in a second configuration when the second configuration file is being executed by the reconfigurable data processor 110, where the first and second configurations are different.

Configurable units in the array of configurable units include configuration data stores 420 (e.g., serial chains) to store unit files comprising a plurality of chunks (or sub-files of other sizes) of configuration data particular to the corresponding configurable units. Configurable units in the array of configurable units each include unit configuration load logic 440 connected to the configuration data store 420 via line 422, to execute a unit configuration load process. The unit configuration load process includes receiving via the bus system (e.g., the vector inputs), chunks of a unit file particular to the configurable unit, and loading the received chunks into the configuration data store 420 of the configurable unit.

The configuration data stores in configurable units in the plurality of configurable units in this example comprise serial chains of latches, where the latches store bits that control configuration of the resources in the configurable unit. A serial chain in a configuration data store can include a shift register chain for configuration data and a second shift register chain for state information and counter values connected in series.

A configurable unit can interface with the scalar, vector, and control buses using three corresponding sets of inputs and outputs (IO): scalar inputs/outputs, vector inputs/outputs, and control inputs/outputs. Scalar IOs can be used to communicate single words of data (e.g., 32 bits). Vector IOs can be used to communicate chunks of data (e.g., 128 bits), in cases such as receiving configuration data in a unit configuration load process, and transmitting and receiving data during operation after configuration across a long pipeline between multiple PCUs. Control IOs can be used to communicate control signals such as the start or end of execution of a configurable unit. Control inputs are received by control block 470, and control outputs are provided by the control block 470.

Each vector input is buffered using a vector FIFO in a vector FIFO block 460 which can include one or more vector FIFOs. Each scalar input is buffered using a scalar FIFO 450. Using input FIFOs decouples timing between data producers and consumers, and simplifies inter-configurable-unit control logic by making it robust to input delay mismatches.

Input configuration data 410 can be provided to a vector FIFO as vector inputs, and then be transferred to the configuration data store 420. Output configuration data 430 can be unloaded from the configuration data store 420 using the vector outputs.

The CGRA uses a daisy chained completion bus to indicate when a load/unload command has been completed. The master AGCU transmits the program load and unload commands to configurable units in the array of configurable units over a daisy-chained command bus. As shown in the example of FIG. 4, a daisy chained completion bus 491 and a daisy chained command bus 492 are connected to daisy chain logic 493, which communicates with the unit configuration load logic 440. The daisy chain logic 493 can include load complete status logic, as described below. The daisy chained completion bus is further described below. Other topologies for the command and completion buses are clearly possible but not described here.

A configurable unit includes multiple reconfigurable datapaths in block 480. A datapath in a configurable unit can be organized as a multi-stage (Stage 1 . . . Stage N), reconfigurable SIMD (Single Instruction, Multiple Data) pipeline. Physical configuration of various stages and components of the SIMD is based on the configuration files loaded in the PCU, and they are reconfigurable based on the configuration files. The chunks of data pushed into the configuration serial chain in a configurable unit include configuration data for each stage of each datapath in the configurable unit. The configuration serial chain in the configuration data store 420 is connected to the multiple datapaths in block 480 via lines 421.

A Pattern Memory Unit (PMU) can contain scratchpad memory coupled with a reconfigurable scalar datapath intended for address calculation, along with the bus interfaces used in the PCU. PMUs can be used to distribute on-chip memory throughout the array of reconfigurable units. In one embodiment, address calculation within the memory in the PMUs is performed on the PMU datapath, while the core computation is performed within the PCU.

Figure 5:
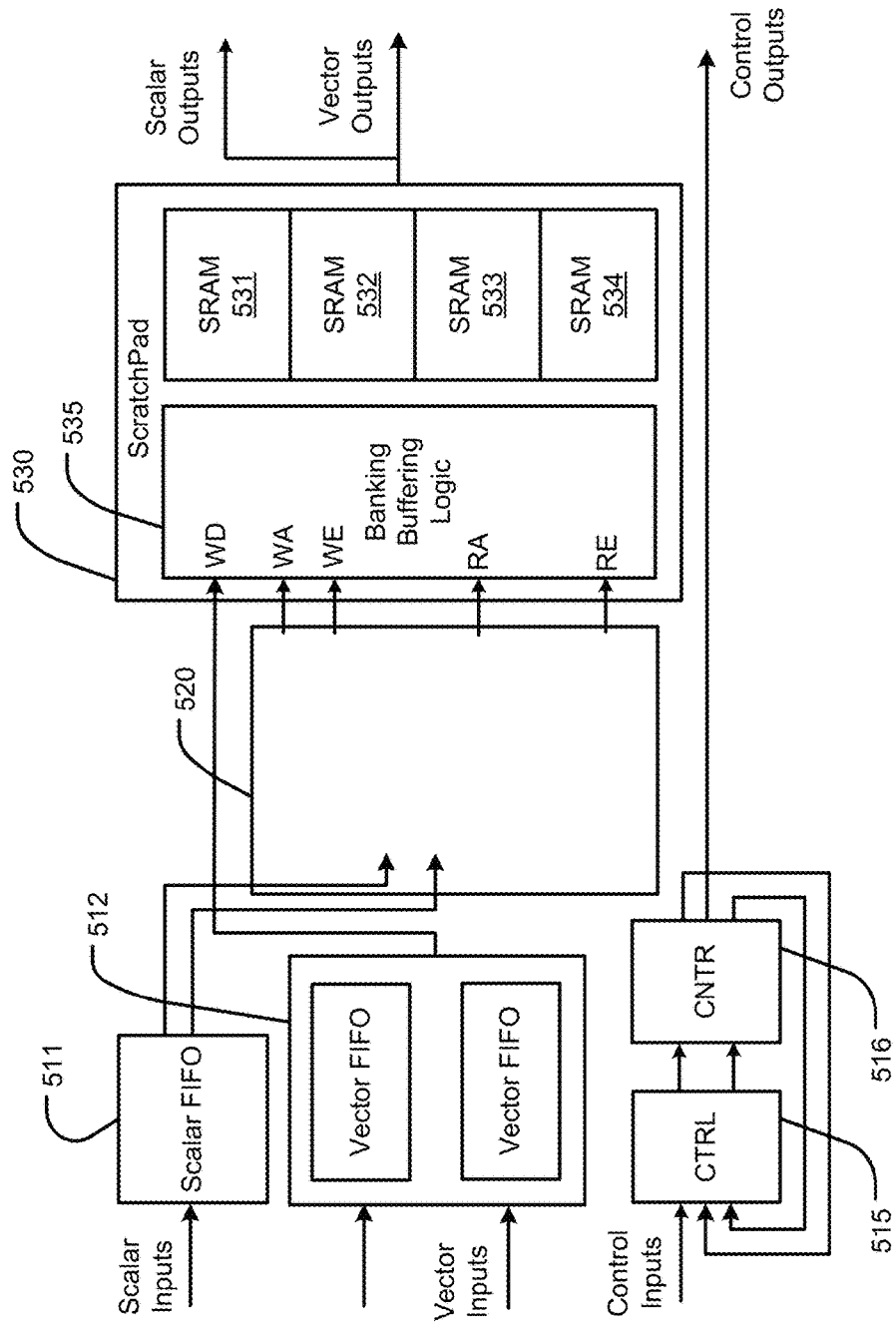
FIG. 5 is a block diagram illustrating an example configurable unit, such as a Pattern Memory Unit (PMU).

FIG. 5 is a block diagram illustrating an example configurable unit 500, such as a Pattern Memory Unit (PMU), which is configured based on configuration files corresponding to one or more applications. For example, a first configuration file corresponding to a first application can configure the PMU 500 in a first configuration when the first configuration file is being executed by the reconfigurable data processor 110, and a second configuration file corresponding to a second application can configure the PMU 500 in a second configuration when the second configuration file is being executed by the reconfigurable data processor 110, where the first and second configurations are different.

A PMU can contain scratchpad memory 530 coupled with a reconfigurable scalar data path 520 intended for address calculation (RA, WA) and control (WE, RE) of the scratchpad memory 530, along with the bus interfaces used in the PCU 400.

The bus interfaces can include scalar inputs, vector inputs, scalar outputs and vector outputs, usable to provide write data WD. The data path can be organized as a multi-stage reconfigurable pipeline, including stages of functional units FUs and associated pipeline registers PRs that register inputs and outputs of the functional units. PMUs can be used to store distributed on-chip memory throughout the array of reconfigurable units.

A scratchpad is built with multiple SRAM banks (e.g., 531, 532, 533, 534). Banking and buffering logic 535 for the SRAM banks in the scratchpad can be configured to operate in several banking modes to support various access patterns. A computation unit as described herein can include a Look-Up Table stored in the scratchpad memory 530, from a configuration file or from other sources. In a computation unit as described herein, the scalar data path 520 can translate a section of a raw input value I for addressing Look-Up Tables implementing a function f(I), into the addressing format utilized by the SRAM scratchpad memory 530, adding appropriate offsets and so on, to read the entries of the Look-Up Table stored in the scratchpad memory 530 using the sections of the input value I. Each PMU can include write address calculation logic and read address calculation logic that provide write address WA, write enable WE, read address RA and read enable RE to the banking buffering logic 535. Based on the state of the local FIFOs 511 and 512 and external control inputs, the control block 515 can be configured to trigger the write address computation, read address computation, or both, by enabling the appropriate counters 516. A programmable counter chain 516 (Control Inputs, Control Outputs) and control block 515 can trigger PMU execution.

This is one simplified example of a configuration of a configurable processor for implementing a computation unit as described herein. The configurable processor can be configured in other ways to implement a computation unit. Other types of configurable processors can implement the computation unit in other ways. Also, the computation unit can be implemented using dedicated logic in some examples, or a combination of dedicated logic and instruction-controlled processors.

Compilation of Applications, Execution Files, and Priority Indicators

Figure 6:
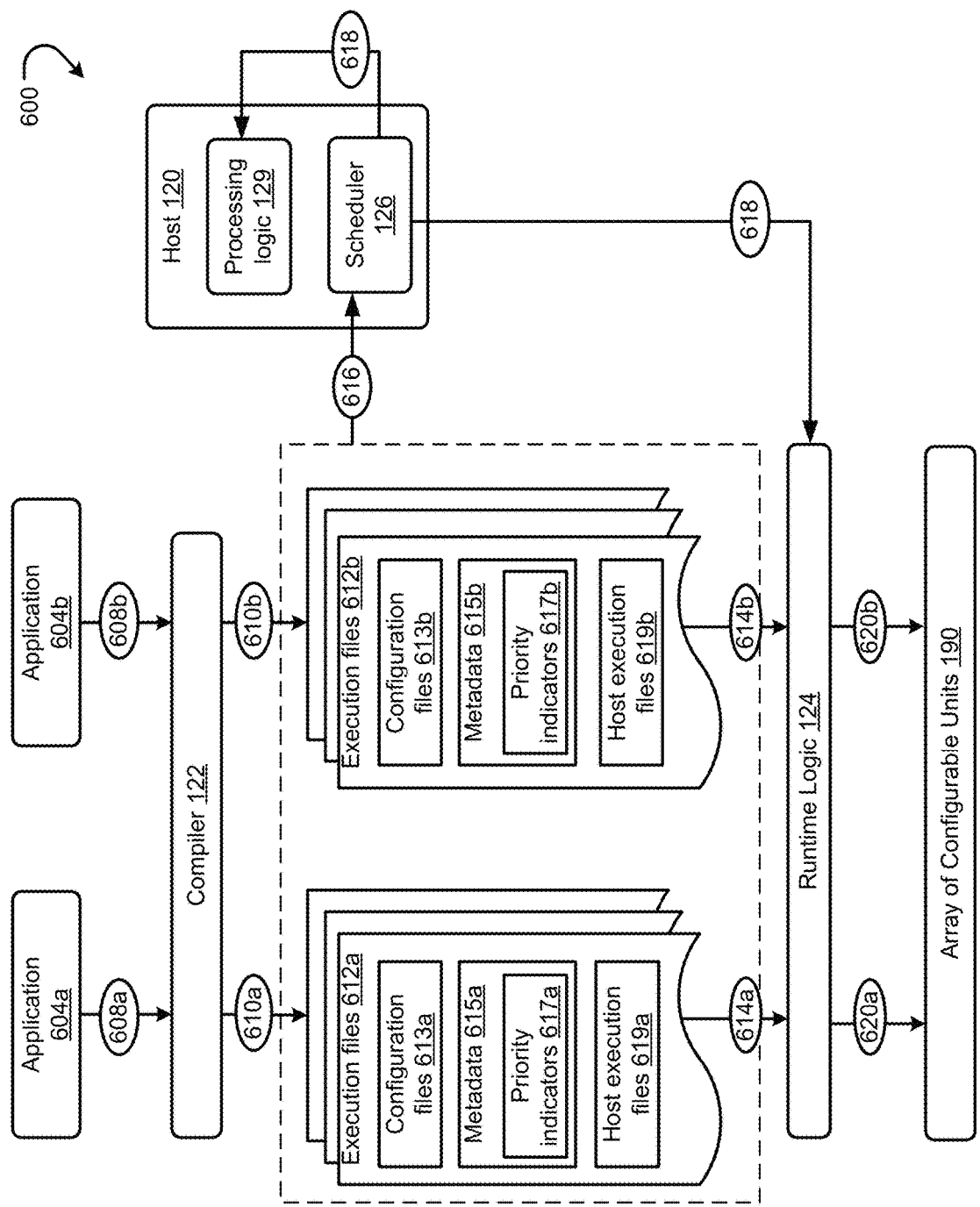
FIG. 6 illustrates a process depicting compilation, scheduling, and execution of configuration files corresponding to multiple applications in the system of FIG. 1.

FIG. 6 illustrates a process 600 depicting compilation, scheduling, and execution of configuration files corresponding to multiple applications in the system 100 of FIG. 1. In the example of FIG. 6, two applications 604a and 604b are compiled and executed by the compiler 122, and scheduled for execution by the scheduler 126. In another example, more than two applications can be compiled and/or scheduled by the scheduler 126, and the merely two applications 604a, 604b illustrated in FIG. 6 are not intended to limit the scope of this disclosure.

At operations 608a and 608b, the compiler 122 executing on the host 120 receives the applications 604a and 604b, respectively, for compilation. Each of the applications 608a, 608b, for example, is an appropriate data flow graph of a corresponding neural network application.

At operation 610a, the compiler 122 compiles the application 604a, to generate one or more execution files 612a corresponding to the application 604a. At operation 610b, the compiler 122 compiles the application 604b, to generate one or more execution files 612b corresponding to the application 604b. The reception and compilation of the two applications can be performed by the compiler 122 in parallel, or sequentially. As discussed, although merely two applications are illustrated in FIG. 6, the compiler 122 can compile more than two applications, in parallel and/or in sequence.

Figure 7:
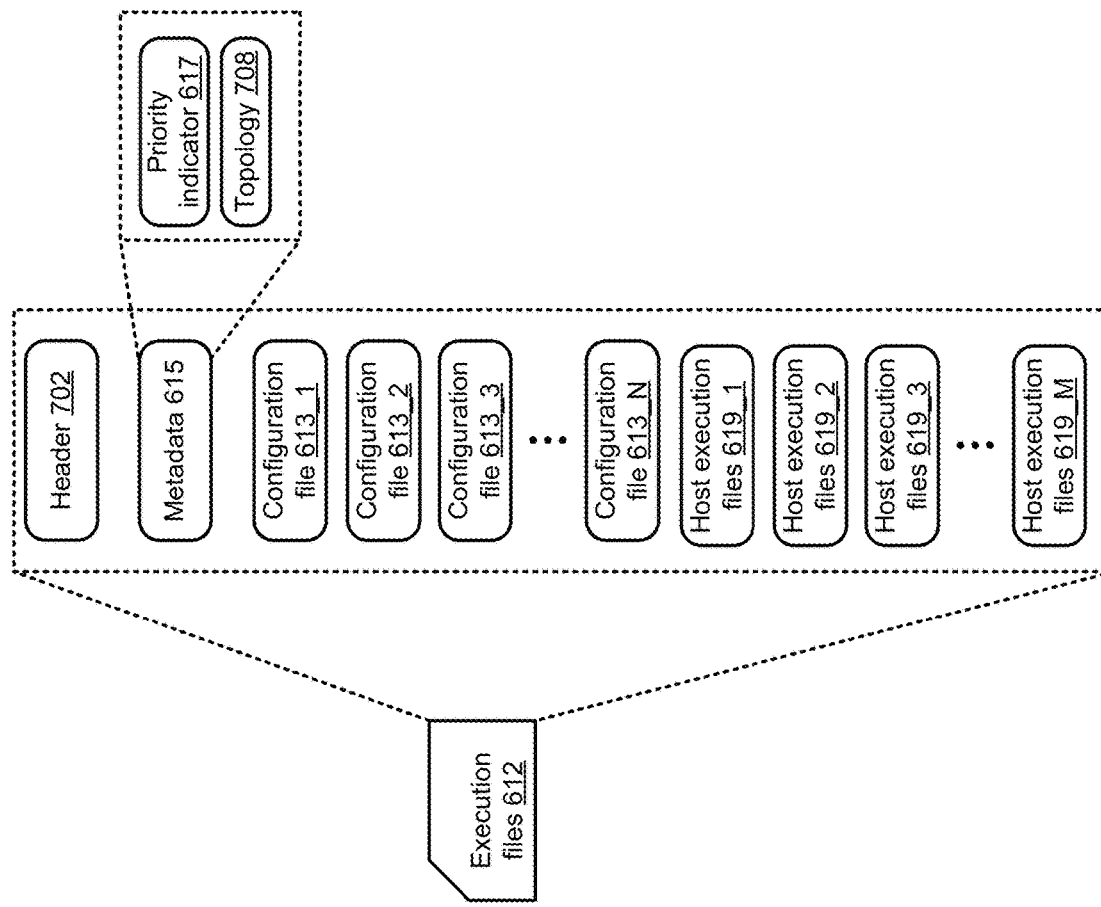
FIG. 7 illustrates an example execution file generated by a compiler.

FIG. 6 illustrates some example components included in the execution files 612, while FIG. 7 discusses execution files in further details. The execution file 612 illustrated in FIG. 7 is an example implementation of any of the execution files 612a and 612b illustrated in FIG. 6.

As discussed herein, certain sections of an application 604 are to be executed by the reconfigurable hardware, while other sections of the application 604 are to be executed by the general hardware. The execution files illustrated in FIGS. 6 and 7 include configuration files 613 implementing sections of the corresponding application that are to be executed by the reconfigurable hardware, as well as host execution files 619 implementing sections of the application 604 that are to be executed by the general hardware.

Referring to FIGS. 6 and 7, the execution files 612a and 612b include corresponding one or more configuration files 613a and 613b, respectively (e.g., the execution files 612a include corresponding one or more configuration files 613a and the execution files 612b include corresponding one or more configuration files 613b). For example, the general execution file 612 of FIG. 7 is illustrated to include N number of configuration files 613_0, . . . , 613_N, where N is an appropriate positive integer greater than one.

The configuration files 613 implement computation graphs of the corresponding application 604 using the configurable units in the reconfigurable hardware. For example, a configuration file comprises a bit-stream representing an initial configuration, or starting state, of each of the configurable units of the reconfigurable hardware that execute the program. This bit-stream is referred to as a bit file, or herein as a configuration file.

The configurable files 613 further comprises a plurality of functions that are to be executed by the reconfigurable hardware, e.g., to execute the corresponding application 604. Examples of functions in the plurality of functions include, but are not limited to, non-linearities like Rectified Linear Units (ReLU) and its variants (e.g., leaky ReLU), convolutions, transpose convolutions, hyperbolic tangents, sigmoids, softmaxs, element-wise additions, matrix multiplications (e.g., General Matrix Multiply (GeMM)), layer normalizations (e.g., batch normalizations), loss functions like cross-entropy, and tensor shape modifiers like transpose.

For example, assume that the application 604a comprises a CNN having a forward pass and a backward pass (e.g., that are at least in part to be executed on the reconfigurable hardware), and a loss function determination path (e.g., that is to be executed on the general hardware). Then the plurality of functions included in the configurable files 613a corresponding to the application 604a would include, for example, convolutions, ReLUs and pooling functions for implementing the forward pass and the backward pass of the CNN.

The execution files 612 further include corresponding host execution files 619 (e.g., the execution files 612a include corresponding host execution files 619a, and the execution files 612b include corresponding host execution files 619b). For example, the execution files 612 of FIG. 7 is illustrated to include M number of host execution files 619_1, . . . , 613_M, where M is an appropriate positive integer greater than zero.

The host execution files 619 include codes that are to be executed by the host 120 (e.g., by the processing logic 129 being executed by the host). For example, referring again to the above example where the application 604a is assumed to be a CNN having a forward pass and a backward pass (e.g., that are to be executed on the reconfigurable hardware) and a loss function determination path (e.g., that is to be executed on the general hardware), the host execution files 619a would include codes to implement the loss function determination path that is to be executed on the general hardware.

Thus, the reconfigurable hardware is to execute the configuration files 613 and the general hardware is to execute the host execution files 619. Execution of the configuration files 613 and the host execution files 619, in combination, result in execution of the corresponding application 604.

Referring to FIG. 7, an execution file 612 includes corresponding header 702 that indicates destinations on the reconfigurable processors for configuration data in the configuration files. Referring to FIGS. 6 and 7, each of the execution files 612 further include corresponding metadata 615 (e.g., the execution files 612a include corresponding metadata 615a, and the execution files 612b include corresponding metadata 615b). Each metadata 615 includes corresponding priority indicators 617 (e.g., metadata 615a includes corresponding priority indicators 617a, and metadata 615b includes corresponding priority indicators 617b). The priority indicators 617 provides priority information (e.g., Quality of Service (QoS), latency information, priority, deadline, etc.) associated with the corresponding application 604, as will be discussed in further detail herein in turn (e.g., with respect to FIG. 9B herein later). In an embodiment, the scheduler 126 schedules execution of the applications 604a, 604b on the general and reconfigurable hardware, based at least in part on the associated priority indicators 617 of the two applications.

As part of the metadata 615, the execution file 612 includes topology information 708 (see FIG. 7) that specifies orientation or shapes of portions of a reconfigurable processor required to load and execute the configuration files for the corresponding application. In one implementation, a reconfigurable processor comprises a plurality of tiles of configurable units, for example, four tiles that form an array of configurable units in the reconfigurable processor. The topology information 708 specifies an orientation of tiles in the plurality of tiles required to load and execute the configuration files for a particular application. For example, when the particular application is allocated two tiles of the reconfigurable processor, the topology information 708 specifies whether the two tiles are arranged in a vertical orientation or a horizontal orientation. The topology information 708 can also allocate a single tile, or all four tiles, of the reconfigurable processor to the corresponding application. In other implementations, other geometries may be specified, such as a group of three tiles.

The metadata 615 further comprises other information, e.g., as discussed in the co-pending U.S. Non-provisional patent application Ser. No. 16/922,975, filed Jul. 7, 2020, entitled, "RUNTIME VIRTUALIZATION OF RECONFIGURABLE DATA FLOW RESOURCES," which is incorporated by reference.

Referring again to the process flow of FIG. 6, at operation 614a, the compiler 122 sends the configuration files 613a to the runtime logic 124 for execution. Similarly, at operation 614b, the compiler 122 sends the configuration files 613b to the runtime logic 124 for execution. Transmission of the configuration files 613a, 613b to the runtime logic 124 can be performed by the compiler 122 in parallel, or sequentially.

At operation 616, the scheduler 126 also accesses the execution files 612a, 612b. For example, the execution files 612a, 612b include corresponding priority indicators 617a, 617b, respectively. The scheduler 126 uses the priority indicators 617a, 617b and various other information (e.g., discussed herein later with respect to FIG. 9B) to schedule execution of the configuration files 613 and host execution files 619 corresponding to the two applications 604a, 604b. For example, the scheduler 126 schedules interleaved use of the reconfigurable hardware and the general hardware by the applications 604a, 604b in a time-shared manner (symbolically illustrated as operations 618 in FIG. 6). For example, the scheduler 126 schedules execution of the configuration files 612a and the configuration files 612b in the array of configurable units 190, and schedules the execution of the host execution files 619a and host execution files 619b in the processing logic 129 of the host 120, as will be discussed herein in further detail in turn.

At operations 620a and 620b, the runtime logic 124 loads the configuration files 612a and 612b, respectively, (or at least sections of the configuration files) and/or the data therefor (e.g., weights, coefficients, vectors, tensors (image data), audio data, natural language processing (NLP data), control data (e.g., control tokens)) on the reconfigurable hardware comprising the array of configurable units 190, based on the schedule provided by the scheduler 126. In an embodiment, the reconfigurable hardware (e.g., the array of configurable units 190) processes various functions included in the configuration files 612a, 612b, e.g., in accordance with the schedule provided by the scheduler 126. Similarly, the general hardware (e.g., the host 120 executing the processing logic 129) also executes portions of the applications 604a, 604b (e.g., the host execution files 619a and 619b) that are to be executed by the general hardware.

Switching Points

Assume that two applications are to be executed in a time-shared manner in the above discussed general hardware (e.g., comprising the host 120) and the reconfigurable hardware (e.g., comprising reconfigurable data processor 110). For example, assume that during a first time period, a first application is being executed in the reconfigurable hardware. Thus, during the first time period, one or more configuration files of the first application are loaded in the reconfigurable hardware, and are being executed by the reconfigurable hardware. For example, one or more configuration files of the first application are loaded and stored in one or more PMUs of the reconfigurable hardware, and at least sections of the one or more configuration files of the first application are loaded in one or more PCUs and executed by the PCUs. Now assume that the scheduler 126 wants to switch the usage of the reconfigurable hardware. That is, the scheduler 126 wants the second application to be executed by the reconfigurable hardware. To perform the switching of the reconfigurable hardware from the first application to the second application, the one or more configuration files of the first application already loaded in the PCUs/PMUs have to be invalidated, and one or more configuration files of the second application have to be loaded and executed in the reconfigurable hardware.

The transfer of the usage of the reconfigurable hardware from one application to another application is referred to as a "switching event." In the above discussed use case example, the switching from the first application to the second application can be performed at one of a plurality of "switching points" pre-defined within the configuration files of the first application. For example, assume that the first application comprises execution of a plurality of convolution operations. Merely as an example, the switching event may not occur when the reconfigurable hardware is in the middle of a convolution operation—rather, the scheduler 126 waits until the current convolution operation is complete, and initiates the switching event at the end of the current convolution operation. Thus, switching of the usage of the reconfigurable hardware from the first application to the second application and/or switching of the usage of the reconfigurable hardware from the second application to the first application cannot occur at any arbitrary point in the configuration files of the first application. Rather, the switching of the usage of the reconfigurable hardware between the first application and the second application can occur at one of a plurality of "switching points" pre-defined within the configuration files of the first application. For example, when the compiler 122 generates the execution files from the application data flow graph of the corresponding application, the compiler 122 defines a plurality of switching points at which a switching event can possibly occur. Note that the reconfigurable hardware can initiate a switching event at a switching point, in response to receiving a switch command from the scheduler 126. In an example, a switching point can be an end of a corresponding execution fragment, as discussed herein later in further detail with respect to FIG. 8.

Figure 8:
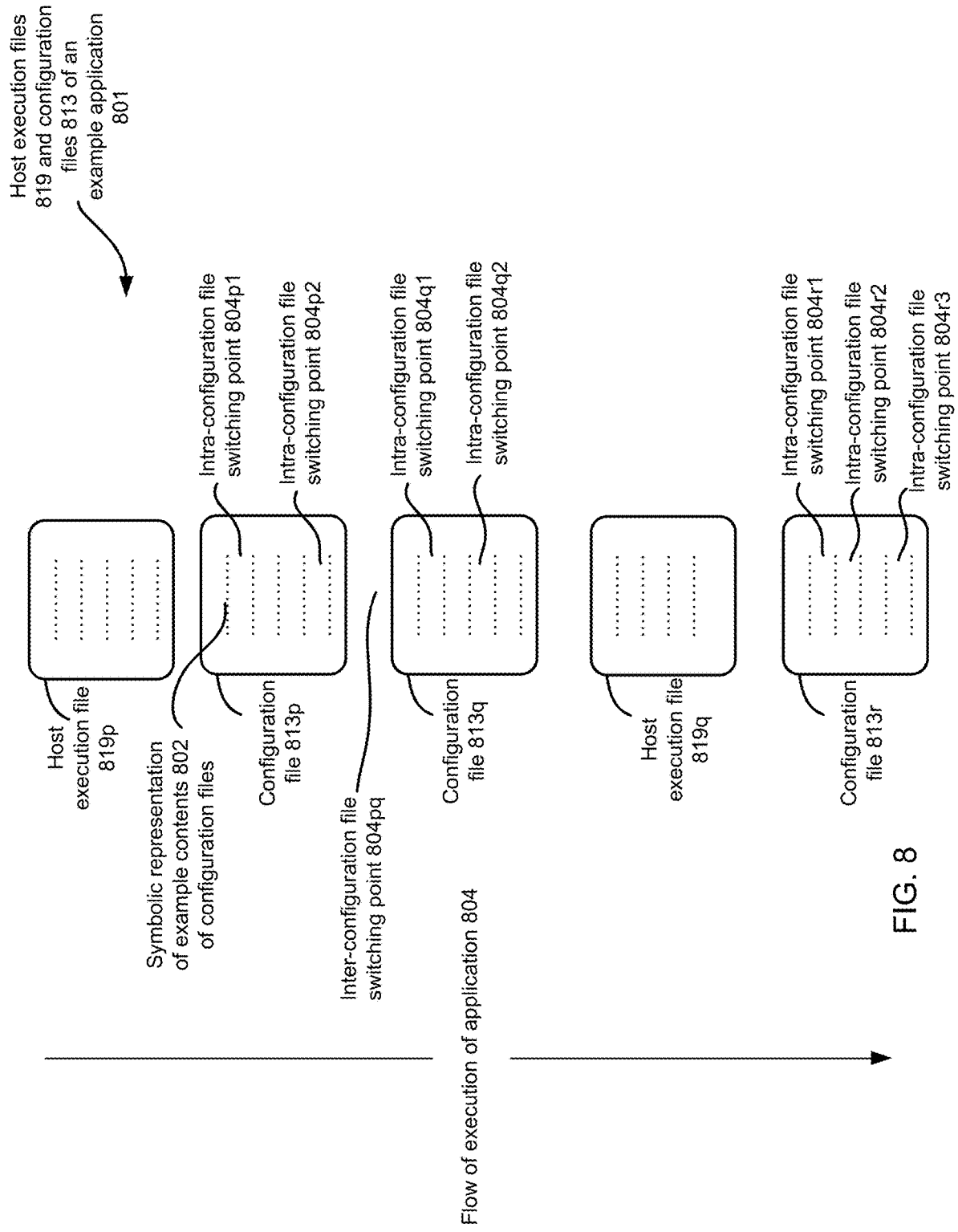
FIG. 8 illustrates a plurality of host execution files and a plurality of configuration files of an example application, and further illustrates example switching points of the configuration files.

FIG. 8 illustrates a plurality of host execution files 819p and 819q and a plurality of configuration files 813p, 813q, and 813r of an example application 801, and further illustrates example switching points 804. For example, FIG. 8 illustrates a sequence in which the various configuration files and host execution files of the application 801 are to be executed (e.g., the sequence of execution, from the top files towards the bottom files, is illustrated using an arrow). For example, the host execution file 819p is to be initially executed by the general hardware (e.g., the host 120), followed by the execution of the configuration file 813p by the reconfigurable hardware, followed by the execution of the configuration file 813q by the reconfigurable hardware, followed by the execution of the host execution file 819q by the general hardware, followed by the execution of the configuration file 813r by the reconfigurable hardware. Note that the number and/or the specific sequence of the host execution files and the configuration files in FIG. 8 are merely examples, and are not intended to limit the scope of this disclosure. Each box representing a file has multiple dots therewithin, where the dots symbolically represent example codes or contents 802 within the corresponding file.

As illustrated, a switching event may occur at a switching point defined between two consecutive or immediate adjacent configuration files, such as the example inter-configuration file switching point 804pq between the two consecutive or immediate adjacent configuration files 813p and 813q. Thus, an inter-configuration file switching point occurs between two configuration files that are to be executed sequentially. At this point (i.e., after execution of the configuration file 813p and prior to execution of the configuration file 813q), the scheduler 126 may schedule switching of the usage of the reconfigurable hardware from the application 801 to another application (or from another application to the application 801).

Note that there may not be an explicit switching point defined between a configuration file and a host execution file, such as between the configuration file 813q and the hose execution file 819q, as there is an implicit switching point between a configuration file and a host execution file. This is because at the end of execution of the configuration file 813q by the reconfigurable hardware, the application 801 is anyway relinquishing the usage of the reconfigurable hardware (e.g., as the host 120 will now execute the host execution file 819q), and the scheduler 126 can now schedule the reconfigurable hardware to be used by another application.

In an embodiment, one or more switching points (referred to herein as "intra-configuration file switching points") can also exist within individual configuration files. For example, FIG. 8 illustrates intra-configuration file switching points 804p1 and 804p2 within the configuration file 813p, intra-configuration file switching points 804q1 and 804q2 within the configuration file 813q, and so on. The number and locations of the intra-configuration file switching points illustrated in FIG. 8 are merely examples and not intended to limit the scope of this disclosure.

When generating the configuration files (e.g., see FIG. 6), the compiler 122 strategically places or defines the intra-configuration file switching points. For example, in the previously discussed example use case where an application is assumed to comprise one or more convolution operations, a switching point can occur at an end of an execution of a convolution operation, but not during the execution of the convolution operation.

Referring to FIG. 3, typically, data associated with an application (e.g., weights, coefficients, vectors, tensors (image data, audio data, natural language processing (NLP data), control data (e.g., control tokens)) that are to be processed by the PMU is loaded in the PCU and/or the PMU. Intermediate results of processing the data are usually stored within the PCU and/or within the PMU. For example, during a convolution operation between an input tensor and a kernel that is performed by a PCU, several mathematical operations are performed, and various intermediate results are generated. Eventually, at the end of the convolution operation, an output tensor is generated. The intermediate results generated while executing the convolution operation are stored locally within the reconfigurable hardware (e.g., within the PCU and/or the PMU). The output tensor generated at the end of the convolution operation is typically stored outside the reconfigurable hardware, such as in an off-chip memory (such as the memory 140 and/or the memory 128). The process of storing data on, or synchronizing data with, the off-chip memory is also referred to as synchronization or materialization of data. Thus, after the synchronization or materialization of data, the data is stored in the off-chip memory. In an embodiment, the compiler 122 defines the points in the configuration files, at which the synchronization or materialization of data occurs, to be the intra-configuration file switching points within the configuration files.

Thus, referring to FIG. 8, synchronization or materialization of data occurs at the intra-configuration file switching point 804p1, for example. Note that during a switching event where the application 801 has to relinquish the use of the reconfigurable hardware to another application, the application 801 would save the state of the application, including the generated data, to an off-chip memory. Because the application 801 anyway saves the generated data to the off-chip memory during synchronization, defining an intra-configuration file switching point to coincide with the synchronization events makes the switching process more efficient. It may be noted that while the execution files of the application 801 will include multiple switching points where switching is possible, actual switching may occur only at a subset of such multiple possible switching points.

In an embodiment, individual configuration file comprises a plurality of execution fragments. For example, an execution fragment (EF) is, in general, a portion of a program implementing a data processing operation, comprising a set of operations, such as a sequence of operations in the program that follow a similar control flow sequence. An EF may be loop bodies, or operations that are executed based on a conditional construct such as an if-else or switch statement. An EF can be hierarchical, and can fully contain other loop nests. One concrete example is an EF defined at the outermost loop level in loop-heavy programs such as deep learning training and inference workloads. Using a control flow graph representation suitable for some implementations, if the program control flow graph G is represented by a set of edges E and vertices V, each unique EF is a distinct subgraph g of G that partitions G into distinct edges e and vertices v of G. In an array of configurable units (such as the reconfigurable data processor 110), a data processing operation can be implemented by defining a plurality of execution fragments of the data processing operations. EFs may consist of a fixed or variable amount of work, as suits the program. Similarly, different EFs may contain different amounts of computation. EFs may represent parallel patterns, portions of parallel patterns or any other subset of operations in the program's control and data flow graph. EFs are discussed further in co-pending U.S. Non-provisional patent application Ser. No. 16/504,627, filed Jul. 8, 2019, entitled, "QUIESCE RECONFIGURABLE DATA PROCESSOR," which is incorporated herein by reference. In an embodiment, an end of an EF is also a synchronization point, where a synchronization event occurs (e.g., data within the reconfigurable processor is synchronized with the off-chip memory). In an embodiment, the end of an EF is a switching point. Thus, switching of execution of an application in the reconfigurable hardware may occur after completion of an execution of an EF and prior to commencement of execution of an immediate subsequent EF, but may not occur while an EF is being executed.

Figure 9A:
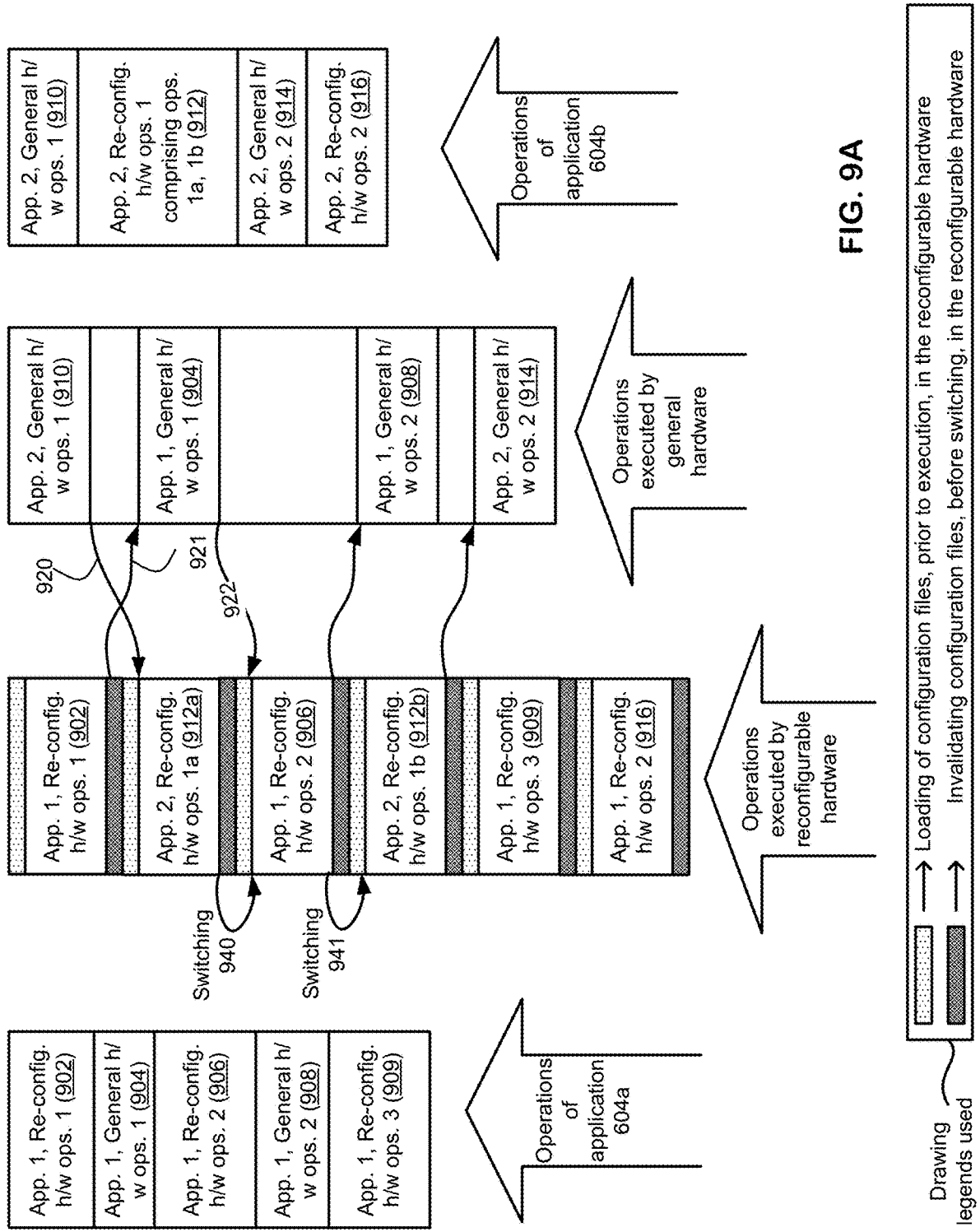
FIG. 9A illustrates an example schedule generated by a scheduler for interleaved usage of reconfigurable and general hardware by multiple applications.

FIG. 9A illustrates an example schedule generated by the scheduler 126 for interleaved usage of reconfigurable and general hardware by multiple applications. A leftmost section of the figure illustrates example operations (illustrated as "ops." in the figure) to be scheduled for the application 604a, which is also referred to as "App. 1" in the figure and in the specification. Similarly, a rightmost section of the figure illustrates example operations to be scheduled for the application 604b, which is also referred to as "App. 2" in the figure and the specification. In this example, each application has reconfigurable hardware and general hardware sections that are executed sequentially. In other examples, an application may have reconfigurable and general hardware sections that can be executed in parallel, overlapping with each other.

Referring now to the leftmost section of the figure, initially, reconfigurable (labelled as "Re-config." in the figure) hardware (referred to as "h/w" in the figure) operations 1 of App. 1 are to be executed in reconfigurable hardware, where the operations 1 of App. 1 are labelled as 902. These operations are included in one or more corresponding configuration files associated with this application.

Execution of the reconfigurable hardware operations 1 of App. 1 are to be followed by execution of general hardware operations 1 of App. 1 in the general hardware of system 100, also labelled as 904 in FIG. 9A. The general hardware operations 1 of App. 1 are included in one or more corresponding host execution files associated with App. 1. Note that although not illustrated in FIG. 9A, in some examples, an application may have reconfigurable and general hardware sections that can be executed in parallel, overlapping with each other. Thus, for example, although not illustrated in FIG. 9A, at least part of the reconfigurable hardware operations 1 of App. 1 can be executed by the reconfigurable hardware in parallel with execution of at least part of the general hardware operations 1 of App. 1 in the general hardware of system 100.

This is to be followed by execution of the reconfigurable hardware operations 2 of App. 1, labelled as 906, which are included in one or more corresponding configuration files associated with this application. This is to be followed by execution of the general hardware operations 2 of App. 1, labelled as 908, which are included in one or more corresponding host execution files associated with this application. This is to be followed by execution of the reconfigurable hardware operations 3 of App. 1, labelled as 909, which are included in one or more corresponding configuration files associated with this application.

Thus, for the App. 1, operations of reconfigurable hardware and general hardware are interleaved, such as operations 1 in reconfigurable hardware, followed by operations 1 in general hardware, followed by operations 2 in reconfigurable hardware, followed by operations 2 in general hardware, followed by operations 3 in reconfigurable hardware.

Such interleaved sequence of reconfigurable and general hardware operations often occurs in neural network and machine learning applications. Merely as an example and without limiting the scope of this disclosure, when implementing a back propagation path of a CNN, input and/or weight gradients are generated, followed by updating of weight parameters. The input and/or weight gradients can be generated using the reconfigurable hardware, whereas weight update can be performed by general hardware. The process of generation of input and/or weight gradients and corresponding updating of the weights are repeated in sequence for various processing nodes of the CNN graph. Accordingly, in this example, reconfigurable hardware and general hardware are sequentially used by the application in an interleaved manner, as illustrated for App. 1 in leftmost section of FIG. 9A.

In another example, in a forward path of a CNN, tensors can be convolved with a corresponding kernel, tiled and zero-padded, and this process of convolution, tiling, and zero-padding is repeated for various sequential processing nodes of the CNN. In an example, the general hardware can perform the tiling and/or zero-padding operations, while the reconfigurable hardware can perform the convolutions. This is yet another example, where the reconfigurable hardware and the general hardware are sequentially used by the application in an interleaved manner, as illustrated for App. 1 in leftmost section of FIG. 9A.

Referring now to the rightmost section of the figure that illustrates sequence of operations for App. 2, initially, general hardware operations 1 of App. 2 are to be executed the general hardware of system 100, labelled as 910. This is to be followed by execution of reconfigurable hardware operations 1 of App. 2 in the reconfigurable hardware, labelled as 912. Note that the reconfigurable hardware operations 1 of App. 2 are broken into two sections—operations 1a and operations 1b, with a switching point between operations 1a and 1b. The switching point can be an inter-configuration file switching point, or an intra-configuration file switching point (see FIG. 8). Thus, operations 1a and 1b can be included in a single configuration file (e.g., the switching point in this case is an intra-configuration file switching point), or operations 1a and 1b can be included in two different and sequential configuration files (e.g., the switching point in this case is an inter-configuration file switching point). Note that various other reconfigurable hardware operations illustrated in FIG. 9A are also likely to include several switching points, although such switching points are not illustrated in the figure or specifically discussed in the specification.

Execution of the reconfigurable hardware operations 1a, 1b of App. 2 are to be followed by execution of general hardware operations 2 of App. 2 in the general hardware of system 100, also labelled as 914 in FIG. 9A. This is to be followed by execution of the reconfigurable hardware operations 2 of App. 2, labelled as 916.

Thus, for the App. 2, operations of general hardware and reconfigurable hardware are also interleaved, such as operations 1 in general hardware, followed by operations 1a, 1b in reconfigurable hardware, followed by operations 2 in general hardware, followed by operations 2 in reconfigurable hardware.

Such interleaved sequence of general and reconfigurable hardware operations also often occurs in neural network and machine learning applications. Merely as an example and without limiting the scope of this disclosure, when implementing a Bidirectional Encoder Representations from Transformers (BERT) model, data may be pre-processed in general hardware, followed by processing of the pre-processed data in reconfigurable hardware, followed by intermediate processing of the data in general hardware, and further processing of the data in reconfigurable hardware, e.g., similar to the sequence of operations illustrated for App. 2.

In another example, App. 2 may be a CNN, here general hardware operations 1 of 910 illustrate pre-processing of data in the general hardware. This is followed by reconfigurable hardware operations 1a, 1b of 912, where the reconfigurable hardware implements various sections of the forward path of the CNN. Subsequently, general hardware operations 2 of 914 are executed, where the general hardware calculates a loss function. Then the reconfigurable hardware operations 2 of 916 are executed, where reconfigurable hardware implements the backpropagation path of the CNN, e.g., similar to the sequence of operations illustrated for App. 2 in FIG. 9A.

It may be noted that as would be appreciated by those skilled in the art, the sequences and number of various operations illustrated in FIG. 9A for Apps. 1 and 2 are merely examples and are implementation specific, and are not intended to limit the scope of this disclosure.

A second column of FIG. 9A (e.g., the second column from the left) illustrates operations executed by the reconfigurable hardware, and a third column of FIG. 9A (e.g., the third column from the left) illustrates operations executed by the general hardware. For example, the scheduler 126 schedules the usage of the reconfigurable and general hardware by the two applications. The schedule illustrated in FIG. 9A is merely an example and is non-limiting.

In the second column, some narrow boxes are dotted, and some other narrow boxes are greyed out. As illustrated in the drawing legend used in the bottom of FIG. 9A, the dotted boxes represent loading of configuration files, prior to execution, in the reconfigurable hardware. For example, when a configuration file is to be executed by the reconfigurable hardware, the configuration file is to be initially loaded in the PMU and PCU of the reconfigurable hardware, and the dotted boxes represent the loading time. Note that FIGS. 10A, 10B, 10C discussed herein later in turn represent various example loading scenarios, and the loading time can change based on such loading scenarios, as will be discussed herein in further detail in turn.

As also illustrated in the drawing legend used in the bottom of FIG. 9A, the greyed boxes represent invalidation of configuration files, after execution and prior to switching, in the reconfigurable hardware. For example, when a configuration file of App. 1 is at least partially executed by the reconfigurable hardware and the reconfigurable hardware is to switch to a different configuration file of App. 2, the configuration file of App. 1 is to be invalidated from the reconfigurable hardware. The greyed-out boxes represent the invalidation time required for such invalidation operation. In some examples, invalidating the configuration file of App. 1 from the reconfigurable hardware may involve deleting the configuration file. In some other examples, invalidating the configuration file of App. 1 from the reconfigurable hardware may involve overwriting the configuration file with another configuration file of App. 2, and thus, in some such examples, a separate invalidation of the configuration file of App. 1 is not required (e.g., accordingly, the greyed-out boxes representing invalidation would not be present in the figures for these examples).

Referring to the second and third columns of FIG. 9A, initially, the scheduler 126 schedules reconfigurable hardware operations 1 of App. 1 in the reconfigurable hardware (e.g., 902), and simultaneously schedules general hardware operations 1 of App. 2 in the general hardware (e.g., 910). Note that the reconfigurable hardware operations 1 of App. 1 in column 2 is after a corresponding dotted box and before a corresponding greyed-out box, implying that the reconfigurable hardware operations 1 of App. 1 are initially loaded in the reconfigurable hardware, executed, and then invalidated prior to the usage of the reconfigurable hardware by App. 2.

After execution of the reconfigurable hardware operations 1 of App. 1, the reconfigurable hardware usage is switched and is now used to execute reconfigurable hardware operations 1a of App. 2 (e.g., 912*a*). Note that the reconfigurable hardware operations 1a of App. 2 are executed after completion of execution of general hardware operations 1 of App. 2 (illustrated by arrow 920). Also, while the reconfigurable hardware operations 1a of App. 2 are being executed by the reconfigurable hardware, general hardware operations 1 of App. 1 are being executed by the general hardware. Thus, there is at least in part a temporal overlap between execution of the reconfigurable hardware operations 1a of App. 2 and the general hardware operations 1 of App. 1, as illustrated.

Note that in the example use case of FIG. 9A, the reconfigurable hardware operations 1 of App. 2 is relatively long (e.g., takes relatively long time to be executed). Accordingly, if the reconfigurable hardware operations 1 of App. 2 is executed continuously till the end, the general hardware will remain idle (e.g., as the general hardware cannot yet execute the general hardware operations 2 of App. 1, because the reconfigurable hardware operations 2 of App. 1 has not yet been executed). In another example, executing the reconfigurable hardware operations 1 of App. 2 continuously till completion may delay execution of operations for App. 1, and App. 1 can have a higher QoS or a lower latency sensitivity than App. 2. Thus, the scheduler 126 decides to only partially execute the reconfigurable hardware operations 1 of App. 2 (e.g., execute operations 1a of App. 2), before switching to operations of App. 1.

Accordingly, at 940, after execution of the reconfigurable hardware operations 1a, the scheduler 126 issues a switch command, and commences a switching event. Accordingly, the reconfigurable hardware operations 1 of App. 2 is terminated, e.g., at the switching point after execution of the reconfigurable hardware operations 1a of App. 2. The reconfigurable hardware usage is switched to App. 1, and the reconfigurable hardware operations 2 of App. 1 is now being executed in the reconfigurable hardware (e.g., 906).

After the execution of the reconfigurable hardware operations 2 of App. 1, at switching event 941, the usage of the reconfigurable hardware is switched to App. 2, and the reconfigurable hardware operations 1b of App. 2 are then executed (e.g., 912b), e.g., at least in part simultaneously with execution of the general hardware operations 2 of App. 1 (e.g., 908).

This process of interleaved usage of the reconfigurable hardware and general hardware between Apps. 1 and 2 continues, until the reconfigurable and general hardware operations of both applications are fully executed. As illustrated, when reconfigurable hardware operations of App. 1 are being executed by the reconfigurable hardware, the general hardware may execute general hardware operations of App. 2. Similarly, when reconfigurable hardware operations of App. 2 are being executed by the reconfigurable hardware, the general hardware may execute general hardware operations of App. 1. In other examples, the reconfigurable hardware operations of App. 1 may overlap with the general hardware operations of App. 1 (e.g., where the reconfigurable hardware operations of App. 1 can be executed at least in part in parallel with execution of the general hardware applications of App. 1). Similarly, in some examples, the reconfigurable hardware operations of App. 2 may overlap with the general hardware operations of App. 2.

There may be some instances where the reconfigurable hardware or the general hardware is idle. For example, in FIG. 9A, the general hardware is idle between operations 904 and 908. The scheduler 126 aims to reduce such idle time. In an embodiment, when the general hardware, such as the host 120, is idle, the host 120 can perform other tasks, such as compilation of other applications.

Figure 9B:
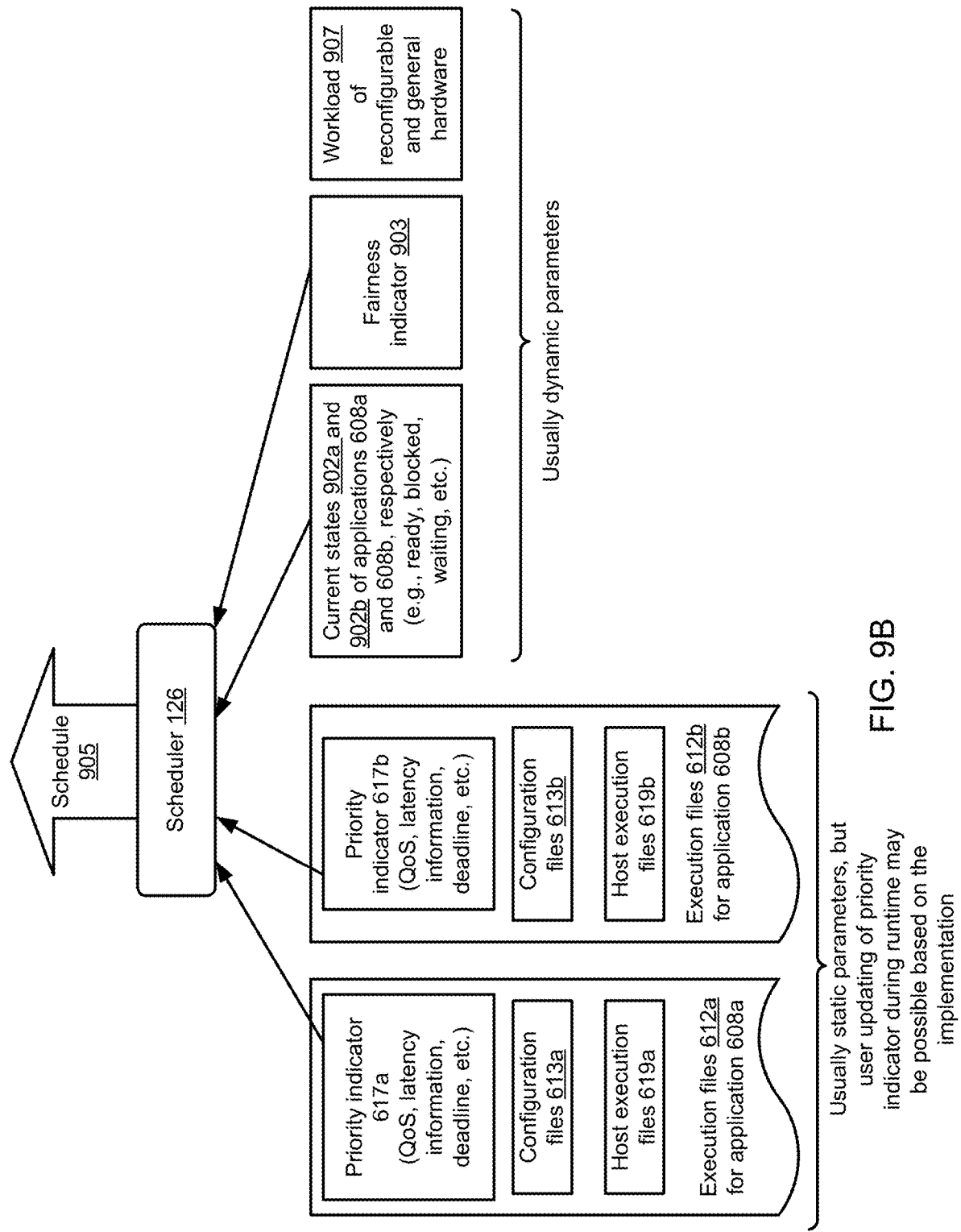
FIG. 9B illustrates example information used by the scheduler to generate the schedule of FIG. 9A.

FIG. 9B illustrates example information used by the scheduler 126 to generate a schedule 905, which may be the schedule of FIG. 9A. For example, the scheduler 126 accesses the execution files 612a and 612b of applications 608a and 608b, respectively. As discussed, the execution files 612 comprise corresponding priority indicators 617. As illustrated in FIG. 9B, the priority indicators 617a of application 608a comprise corresponding QoS, latency information, deadline, and/or one or more other parameters indicative of priority information of the application 608a. The priority indicators 617b of application 608b comprise similar priority information.

In an example, the QoS of the priority indicator 617a comprises a QoS identifier associated with the application 608a, and the QoS of the priority indicator 617b comprises a QoS identifier associated with the application 608b. Different applications can have different associated QoS. For example, assume that two Generative Pre-trained Transformer 3 (GPT-3) models are scheduled as application 608a and 608b in the system 100. Assume that a first GPT-3 model (which may be application 608a) is in a training phase, while a second GPT-3 model (which may be application 608b) is in an inference phase. In an example implementation, if inferencing from the second GPT-3 model is relatively more important than training the first GPT-3 model, then the second GPT-3 model can have a higher QoS than the first GPT-3 model. In another example implementation, if training the GPT-3 models is relatively more important than inferencing, then the first GPT-3 model can have a higher QoS than the second GPT-3 model.

In an example, the latency information of the priority indicator 617a comprises a latency sensitivity associated with the application 608a and/or a target maximum latency for the application 608a, and the latency information of the priority indicator 617b comprises similar latency information for the application 608b. For example, some applications may be able to tolerate higher latency than other applications. For example, a Natural Language Processing (NLP) machine learning model that provides real-time answers or results to users can have a relatively small latency sensitivity, such as in the range to a few milliseconds or less than a second. In another example, another NLP machine learning model that processes and categorizes user queries for future training of other models can have relatively large latency sensitivity.

In an example, the deadline information of the priority indicator 617a comprises a deadline timestamp by which the execution of the application 608a has to be completed, and the deadline information of the priority indicator 617b comprises similar information for the application 608b. For example, for a machine learning application that predicts weather information to be broadcast in a television show, there can be a deadline timestamp. For example, the weather prediction has to be completed at least 10 minutes prior to the prediction broadcast on television.

In an embodiment, the scheduler 126 takes into account the priority indicators 617a, 617b, while scheduling operations of the applications. For example, as discussed with respect to FIG. 9A, the reconfigurable hardware operations 1 of App. 2 is relatively long (e.g., takes a relatively long time to be executed). Accordingly, executing the reconfigurable hardware operations 1 of App. 2 continuously till completion may delay execution of operations for App. 1, and App. 1 can have a higher QoS or a lower latency sensitivity than App. 2. Thus, in the example of FIG. 9A, the scheduler 126 decides to only partially execute the reconfigurable hardware operations 1 of App. 2 (e.g., only execute operations 1a of App. 2), before switching to reconfigurable hardware operations 2 of App. 1 at switching event 940.

In an embodiment, the scheduler 126 also takes into account length of various operations of the applications that are to be executed in the reconfigurable hardware and general hardware. For example, assume that a relatively large BERT model and a relatively small BERT model are App. 1 and App. 2, respectively, of FIG. 9A. Both BERT models can have data that are to be initially pre-processed by the general hardware, and then to be processed by the reconfigurable hardware. The large BERT model (such as a hugging face BERT model) can have a higher amount of data to be pre-processed compared to the smaller BERT model. Accordingly, initial general hardware operations for the large BERT can take longer to execute than initial general hardware operations for the smaller BERT. In an example implementation, the scheduler 126 can first schedule execution of the initial general hardware operations for the smaller BERT. Subsequently, the scheduler 126 may schedule the reconfigurable hardware usage of the smaller BERT, while the general hardware pre-processes data of the larger BERT. This way, the reconfigurable hardware is not idle for a long time. If, however, the scheduler 126 first schedules execution of the initial general hardware operations for the larger BERT, this will take a long time, during which the reconfigurable hardware may be idle. Of course, these are implementation specific example decisions, and are not intended to limit the scope of this disclosure.

Referring to FIGS. 6 and 9B, during compilation, the compiler 122 receives priority indicator information for an application (e.g., priority indicator information associated with the application, and/or provided by a user). When compiling the corresponding execution file, the compiler 122 embeds the priority indicator 617 within the metadata, based on such priority indicator information. Once the metadata comprising the priority indicator 617 is generated, the compiler or another component of the system 100 may not alter the execution file comprising the metadata. Accordingly, FIG. 9B illustrates the execution file to be static, in the sense that once compiled, information within the execution file (such as metadata comprising the priority indicator 617, configuration files, host execution files) are usually not re-compiled or altered. Of course, such static nature is implementation specific and is not intended to be limiting in nature, and in some other example implementations, the priority indicator 617 can be altered (e.g., by a user or the compiler 122) after compilation (e.g., to change the QoS and/or latency sensitivity) during runtime.

In addition to taking into account information included in the execution files, the scheduler 126 can take into account other factors, when generating the schedule 905, such as current states 902a, 902b of applications 608a, 608b, respectively. At any point during execution, an application can be at one of a plurality of possible states, such as a ready state, a blocked state, a waiting state, etc.

A ready state of an application indicates that operations of the application are ready to be executed, and as soon as the operations are scheduled for execution, execution of the operations can commence.

A waiting state of the application indicates that the application is waiting for completion of a task, either by the application or by another application. For example, assume that the application needs data from an off-chip memory, and the application has issued a read request to the memory. Now the application is in a waiting state, waiting for the data to be fetched from the off-chip memory. A waiting state of an application indicates that if the scheduler schedules operations for the application, it may take some time for commencement of execution of the scheduled operations, e.g., depending on an amount of time it takes to resolve or exit the waiting state.

A blocked state of the application indicates that the application is currently blocked from being executed, and will commence execution once the blocking condition is resolved. For example, assume that the application needs data from a remote, cloud-based storage, and the application has issued a read request to the remote storage via a network. Now the application is blocked, as the application cannot execute until the requested data is received from the remote storage. The time taken to resolve the blocked state can be, for example, based on a speed of the network, such as the Internet. Similar to the waiting state, a blocked state of an application indicates that if the scheduler schedules operations for the application, it may take some time for the scheduled operations to execute, e.g., depending on an amount of time it takes to resolve the blocked state.

In an embodiment, the scheduler 126 takes into account various other factors, such as fairness indicator 903, workload 907 of the reconfigurable and general hardware, and/or the like. As discussed, while the execution files 612, including the priority indicators 617 are static in some examples, the current states 902, fairness indicators 903, and the workload 907 are dynamic and alter during execution of the applications.

In an example, if an application is stalled in the waiting state or the blocked state for a relatively long time period, it may not be fair for the application (e.g., the application will take relatively long time to complete). Accordingly, a fairness indicator 903 for that application will have a value that emphasizes a higher fairness factor for the application. Accordingly, once the stall condition is resolved, based on the higher fairness factor, the application may be given higher priority by the scheduler.

In an example, the scheduler 126 takes into account workload 907 of the reconfigurable and general hardware. For example, while scheduling, the scheduler 126 may aim to optimize the workload, and try to keep both the reconfigurable and general hardware engaged as much as possible. For example, referring to the switching event 940 of FIG. 9A, the scheduler 126 may realize that if the reconfigurable hardware operations 1 of App. 2 is executed continuously, the general hardware will remain idle (e.g., as the general hardware cannot yet execute the general hardware operations 2 of App. 1, because the reconfigurable hardware operations 2 of App. 1 has not yet been executed). Hence, the scheduler 126 can cause the switching event 940, as discussed with respect to FIG. 9A. Thus, the scheduler aims to optimize usage of the reconfigurable hardware and/or the general hardware to the extent possible.

Figure 10A:
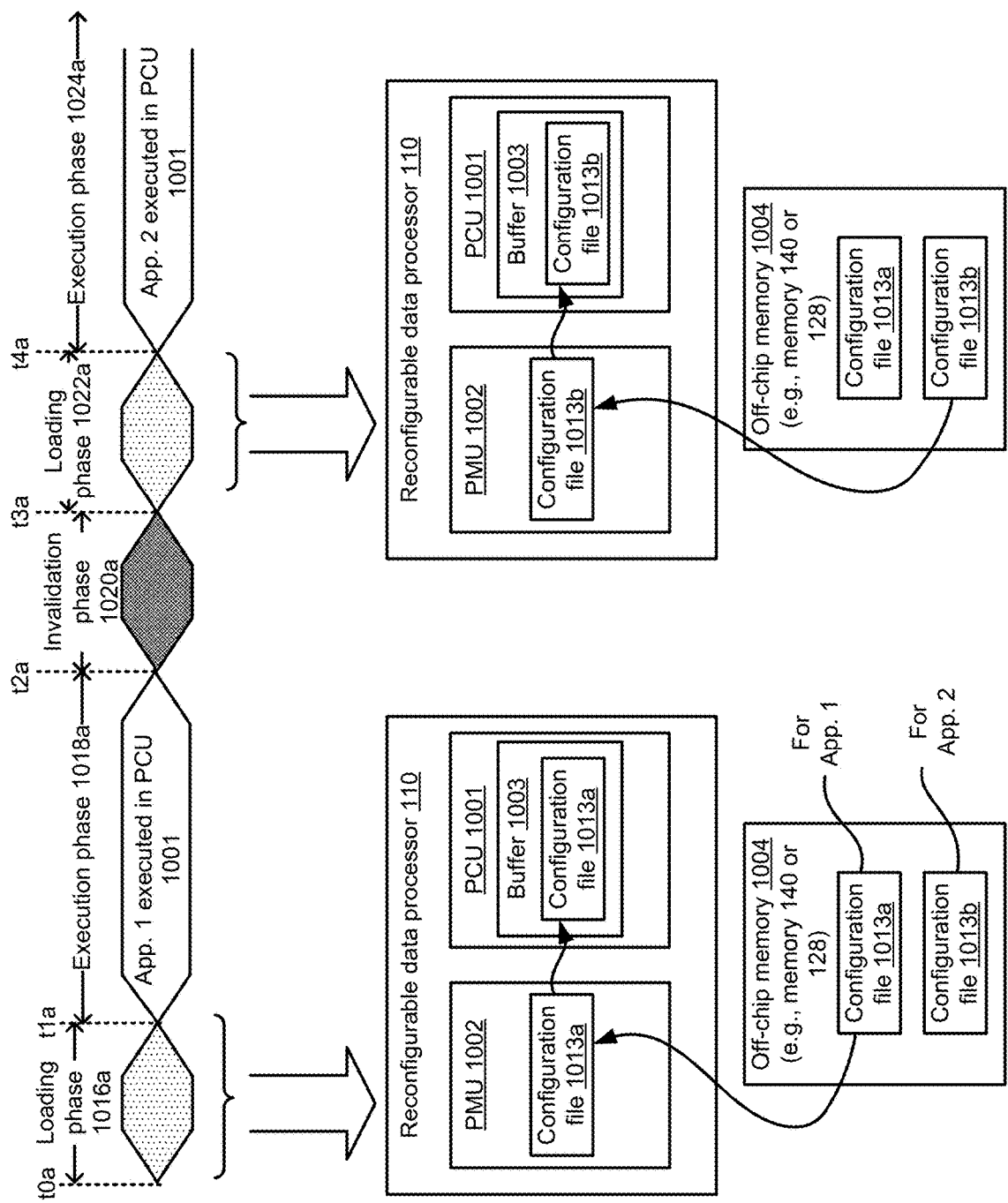
FIGS. 10A, 10B, and 10C illustrate three respectively example implementations of loading of configuration files, when interleaving usage of the reconfigurable hardware by two applications.
Figure 10B:
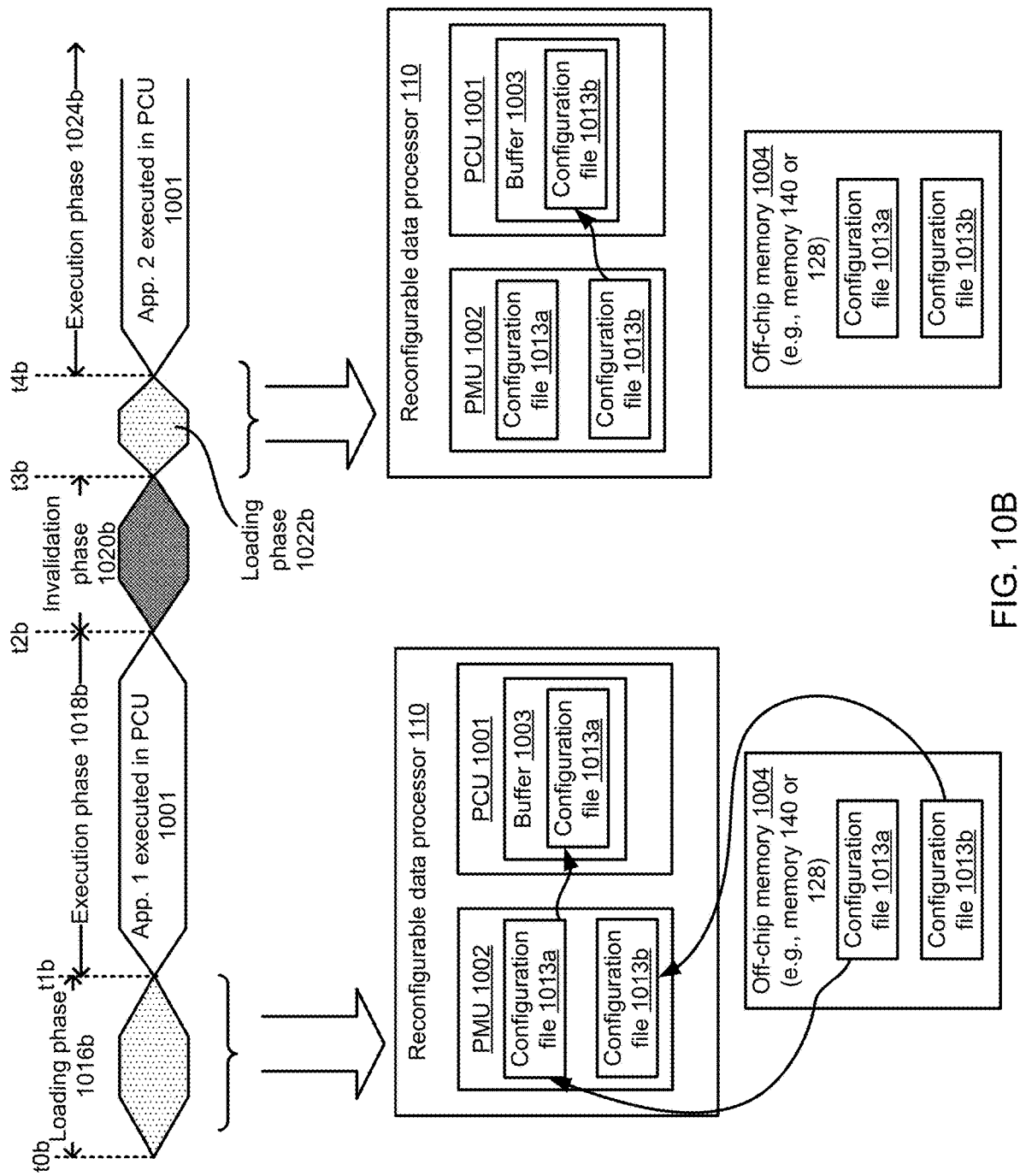
Figure 10C:
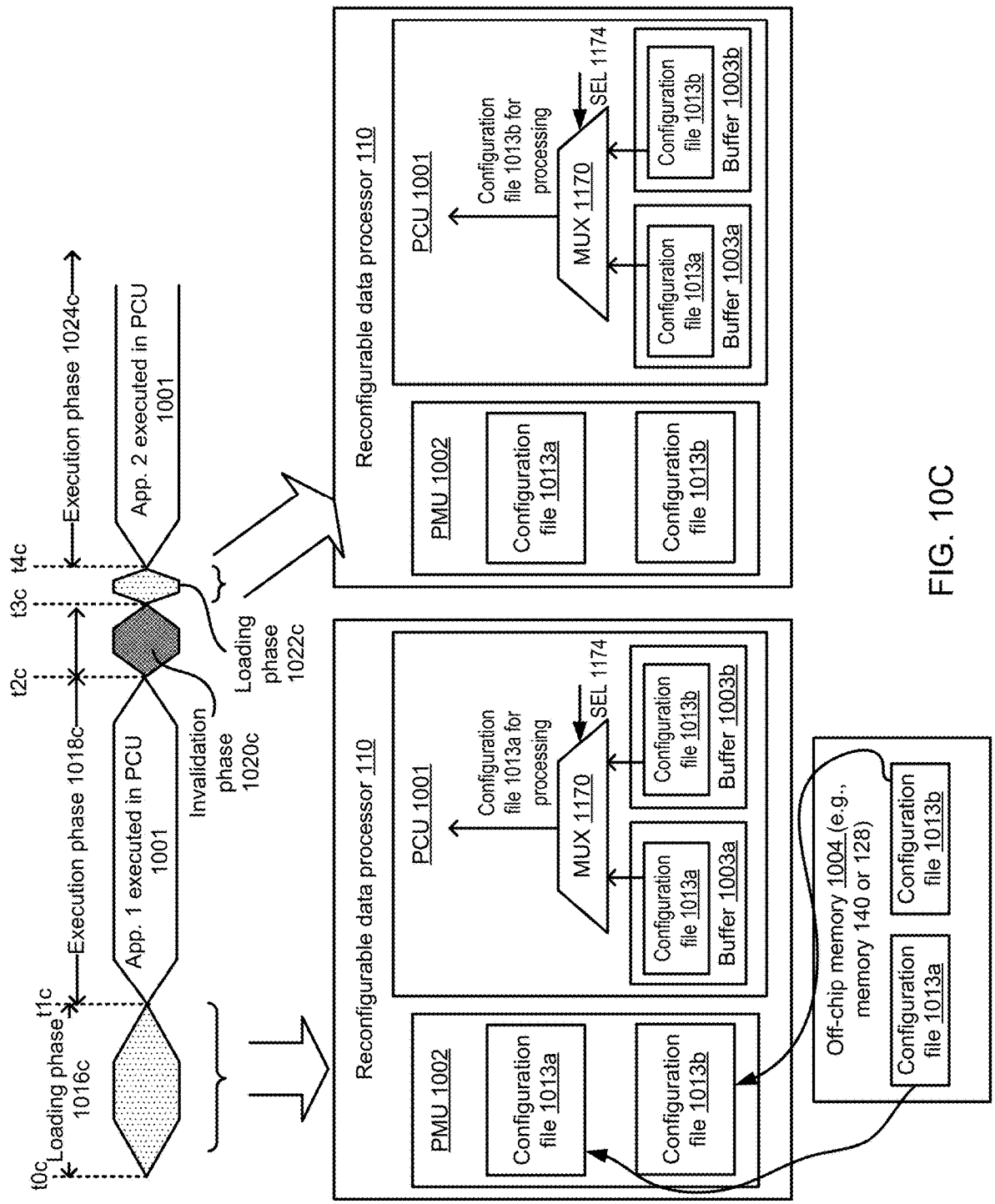

FIGS. 10A, 10B, and 10C illustrates three example implementations of loading of configuration files while interleaving usage of the reconfigurable hardware by two applications. Although these figures are directed towards loading of configuration files, similar principles can also be applied to loading of data for the two applications, as would be appreciated by those skilled in the art based on the discussion with respect to these figures.

Referring to FIG. 10A, illustrated is a scenario where a configuration file is loaded from an off-chip memory 1004, each time there is a switching of an application using the reconfigurable hardware. For example, illustrated in top section of FIG. 10A is a timing diagram, where between time t0a and t1a, a loading phase 1016a occurs. During the loading phase 1016a, App. 1 is loaded in a PCU 1001 for execution. For example, an off-chip memory 1004 (which can be either memory 140 or memory 128) stores configuration file 1013a for App. 1 and configuration file 1013b for App. 2. During the loading phase 1016a, the configuration file 1013a is loaded from the off-chip memory 1004 to a PMU 1002, and at least a part of the configuration file 1013a is then loaded from the PMU 1002 to a buffer 1003 of the PCU 1001. The configuration file 1013*a* remains loaded and is executed by the PCU 1001 during a first execution phase 1018*a*, e.g., until time t2*a*.

At time t2*a*, a switching event is initiated, and an invalidation phase 1020*a* commences from time t2*a* and lasts until time t3*a*. Note that the shadings of the loading and invalidation phase in FIG. 10A is similar to those in FIG. 9A. During the invalidation phase 1020*a*, the configuration file 1013*a* is invalidated (e.g., deleted) in the PMU 1001 and/or the PCU 1001.

A second loading phase 1022*a* occurs between time t3*a* and time t4*a*, during which a configuration file 1013*b* for App. 2 is loaded into the PMU 1002 and the PCU 1001 from the off-chip memory 1004. The configuration file 1013*b* remains loaded and is executed by the PCU 1001 during a second execution phase 1024*a* that starts from time t4*a*.

Thus, in the example of FIG. 10A, the storage capacity of the PMU 1002 and/or the PCU 1001 are not enough to load both the configuration files 1013*a*, 1013*b* at the same time. Accordingly, during the first loading phase 1016*a*, the configuration file 1013*a* corresponding to App. 1 is loaded in the PMU 1002 and/or the PCU 1001; and during the second loading phase 1022*a*, the configuration file 1013*b* corresponding to App. 2 is loaded in the PMU 1002 and/or the PCU 1001.

Although not illustrated in FIG. 10A, data associated with App. 1 and App. 2 can be loaded from the off-chip memory 1004 to the PCUs/PMUs, e.g., based on the application currently being executed.

Referring now to FIG. 10B, illustrated is a scenario where multiple configuration files for multiple corresponding applications are simultaneously loaded onto the PMU 1002 of the reconfigurable hardware. For example, illustrated in top section of FIG. 10B is a timing diagram where between time t0*b* and t1*b*, a loading phase 1016*b* occurs. During the loading phase 1016*b*, configuration file 1013*a* of App. 1 and configuration file 1013*b* of App. 2 are both loaded in the PMU 1002. Furthermore, from the PMU 1002, the configuration file 1013*a* of App. 1 is loaded in the buffer 1003 of the PCU 1001. Thus, in this scenario, the PMU 1002 is large enough to accommodate both the configuration files 1013*a* and 1013*b*. As both configuration files 1013*a* and 1013*b* are loaded, the initial loading phase 1016*b* may be slightly longer than the loading phase 1016*a* of FIG. 10A. The configuration file 1013*a* remains loaded and is executed by the PCU 1001 during a first execution phase 1018*b*, e.g., until time t2*b*.

At time t2*b*, a switching event is initiated, and an invalidation phase 1020*b* commences from time t2*b* and lasts until time t3*b*. During the invalidation phase 1020*b*, the configuration file 1013*a* is invalidated (e.g., deleted) in the PCU 1001 (but not from the PMU 1002).

A second loading phase 1022*b* occurs between time t3*b* and time t4*b*, during which the configuration file 1013*b* for App. 2 is loaded from the PMU 1002 to the PCU 1001. As the configuration file 1013*b* for App. 2 need not be loaded from the off-chip memory 1004 (and is to be loaded from the PMU to the PCU), the loading phase 1022*b* of FIG. 10B is considerably shorter than the loading phase 1022*a* of FIG. 10A. The configuration file 1013*b* remains loaded and is executed by the PCU 1001 during a second execution phase 1024*b*.

Thus, after the initial loading phase 1016*b* (when configuration files of both applications are loaded in the PMU 1002), each time there is a switching event between App. 1 and App. 2, the corresponding configuration file is loaded from the PMU 1002 to the PCU 1001. Because such loading avoids the off-chip memory 1004, all subsequent loading phases for the scenario discussed with respect to FIG. 10B will also be considerably shorter than the loading phase 1022*a* of FIG. 10A.

Referring now to FIG. 10C, illustrated is a scenario where multiple configuration files for multiple corresponding applications are simultaneously loaded onto the PCU 1001 of the reconfigurable hardware. For example, illustrated in top section of FIG. 10C is a timing diagram, where between time t0*c* and t1*c*, a loading phase 1016*c* occurs. During the loading phase 1016*c*, configuration file 1013*a* of App. 1 and configuration file 1013*b* of App. 2 are both loaded from the off-chip memory 1004 to the PMU 1002. Subsequently, configuration file 1013*a* of App. 1 is loaded from the PMU 1002 to a buffer 1003*a* of the PCU 1001, and configuration file 1013*b* of App. 2 is loaded from the PMU 1002 to a buffer 1003*b* of the PCU 1001. Thus, in this scenario, the buffers 1003*a*, 1003*b* of the PCU 1001 are large enough to accommodate both the configuration files 1013*a* and 1013*b* of both applications. As both configuration files 1013*a* and 1013*b* are loaded in the PCU 1001, the initial loading phase 1016*c* of FIG. 10C may be slightly longer than the loading phase 1016*a* of FIG. 10A.

In an example implementation, the vector FIFO block 460 (see FIG. 4) are partitioned to form the buffers 1003*a*, 1003*b*. In another example implementation, one or more buffers (see FIG. 4) within the configuration data store 420 are partitioned to form the buffers 1003*a*, 1003*b*. In yet another example, registers of the PCU 1001 (e.g., instead of, or in addition to, the buffers 1003*a*, 1003*b*) are used to load the configuration files.

Furthermore, a multiplexer 1170 receives a selection signal 1174 from the scheduler 126, and provides one of the configuration files 1013*a*, 1013*b* to execution logic of the PCU 1001, depending on the application that is currently scheduled for execution by the scheduler 126. For example, during the loading phase 1016*c*, the multiplexer 1170 outputs the configuration file 1013 of App. 1 for processing by the PCU 1001 (e.g., as the subsequent execution phase 1018*c* is for App. 1).

During the first execution phase 1018*c* of App. 1, both the configuration files 1013*a*, 1013*b* remain loaded in the PCU 1001, and the PCU 1001 executes the output of the multiplexer 1170, e.g., executes the configuration file 1013*a* during the first execution phase 1018*c*.

At time t2*c*, a switching event is initiated, and an invalidation phase 1020*c* commences from time t2*b* and lasts until time t3*b*. During the invalidation phase 1020*c*, the configuration file 1013*a* output by the multiplexer 1170 and being executed by the PCU 1001 is invalidated (e.g., deleted), but the copy of the configuration files 1013*a*, 1013*b* are both retained in the buffer 1003*a*, 1003*b*, respectively. Because the configuration files need not be invalidated in the buffers, the invalidation phase 1020*c* of FIG. 10C is shorter than the invalidation phase 1020*a* of FIG. 10A.

A second loading phase 1022*c* occurs between time t3*c* and time t4*c*, during which the multiplexer 1170 outputs configuration file 1013*b* for App. 2 from the buffer 1013*b*, based on the selection signal 1174 generated by the scheduler 126. Thus, in the scenario of FIG. 10B, no configuration file has to be loaded from the off-chip memory 1004 or from the PMU 1002. Accordingly, the loading phase 1022*c* of FIG. 10C is shorter than the loading phase 1022*a* of FIG. 10A and the loading phase 1022*b* of FIG. 10B. Both the configuration files 1013*a* and 1013*b* remain loaded, and the configuration file 1013*b* is executed by the PCU 1001 during the second execution phase 1024*b*.

Thus, each time there is a switching event between App. 1 and App. 2, the corresponding configuration file is output by the multiplexer 1170, based on the selection signal 1174 generated by the scheduler 126. Also, both the configuration files 1013a, 1013b remain loaded in the PCU 1001. Because such loading avoids the off-chip memory 1004 and the PMU 1002, all subsequent loading phases for the scenario discussed with respect to FIG. 10C will also be shorter than the loading phase 1022a of FIG. 10A, as well as the loading phase 1022b of FIG. 10B.

While the present invention is disclosed by reference to the preferred embodiments and examples detailed above, it is to be understood that these examples are intended in an illustrative rather than in a limiting sense. It is contemplated that modifications and combinations will readily occur to those skilled in the art, which modifications and combinations will be within the spirit of the invention and the scope of the following claims.

The invention claimed is:

1. A method for executing applications in a system comprising general hardware and reconfigurable hardware, the method comprising:
 accessing a first execution file comprising metadata storing a first priority indicator associated with a first application, and a second execution file comprising metadata storing a second priority indicator associated with a second application;
 interleaving use of the reconfigurable hardware by the first application and the second application, and scheduling the interleaving to take into account (i) workload of the reconfigurable hardware and (ii) the first priority indicator and the second priority indicator associated with the first application and the second application, respectively;
 when the reconfigurable hardware is used by a first one of the first and second applications, using the general hardware by either the first one or a second one of the first and second applications;
 configuring the reconfigurable hardware in a first configuration, when the reconfigurable hardware is used by the first application;
 configuring the reconfigurable hardware in a second configuration that is different from the first configuration, when the reconfigurable hardware is used by the second application;
 the first execution file further comprises a first configuration file, and the second execution file further comprises a second configuration file;
 the first configuration file comprises configuration information usable to configure the reconfigurable hardware in the first configuration;
 the second configuration file comprises configuration information usable to configure the reconfigurable hardware in the second configuration;
 receiving a data flow graph associated with the first application; and
 compiling the data flow graph, to generate the first execution file comprising (i) the first configuration file and (ii) the metadata storing the first priority indicator.

2. The method of claim 1, wherein:
 the reconfigurable hardware comprises an array of configurable units, the array of configurable units comprising a first configurable unit including a multi-stage SIMD (Single Instruction, Multiple Data) pipeline; and
 configuring the reconfigurable hardware in the first and second configurations comprise configuring the multi-stage SIMD differently in the first and second configurations.

3. The method of claim 1, wherein:
 the reconfigurable hardware comprises an array of configurable units that includes at least a configurable switch, a first Pattern Compute Unit (PCU), a second PCU, and a Pattern Memory Unit (PMU); and
 configuring the reconfigurable hardware in the first and second configurations comprise configuring the configurable switch differently in the first and second configurations, such that the configurable switch interconnects the first PCU with the PMU in the first configuration, and the configurable switch interconnects the second PCU with the PMU in the second configuration.

4. The method of claim 1, wherein:
 the reconfigurable hardware comprises an array of configurable units that includes at least a first compute unit, a second compute unit, and a configurable memory unit; and
 configuring the reconfigurable hardware in the first and second configurations comprise
  configuring the memory unit differently in the first and second configurations, such that the memory unit stores data from the first compute unit in the first configuration, and the memory unit stores data from the second compute unit in the second configuration.

5. The method of claim 1, wherein:
 configuring the reconfigurable hardware in the first configuration comprises configuring a reconfigurable unit of the reconfigurable hardware to implement first one or more of a plurality of functions; and
 configuring the reconfigurable hardware in the second configuration comprises configuring the reconfigurable unit of the reconfigurable hardware to implement second one or more of the plurality of functions,
 wherein the plurality of functions comprises two or more of Rectified Linear Units (ReLU), leaky ReLU, convolution, transpose convolution, hyperbolic tangent, sigmoid, softmax, element-wise addition, matrix multiplication, General Matrix Multiply (GeMM), layer normalization, batch normalization, loss function, and tensor shape modifier.

6. The method of claim 1, wherein:
 the first execution file comprises (i) a first one or more sections that are to be executed by the general hardware and (ii) a second one or more sections that are to be executed by the reconfigurable hardware;
 the second execution file comprises (i) a third one or more sections that are to be executed by the general hardware and (ii) a fourth one or more sections that are to be executed by the reconfigurable hardware; and
 interleaving use of the reconfigurable hardware comprises:
  scheduling execution of at least one of the second one or more sections of the first application by the reconfigurable hardware simultaneously with execution of at least one of the third one or more sections of the second application by the general hardware.

7. The method of claim 6, wherein interleaving use of the reconfigurable hardware further comprises:
 scheduling execution of at least one of the fourth one or more sections of the second application by the reconfigurable hardware simultaneously with execution of at least one of the first one or more sections of the first application by the general hardware.

8. The method of claim 6, wherein interleaving use of the reconfigurable hardware further comprises:
time-multiplexing use of the reconfigurable hardware by the first application and the second application, such that the second one or more sections of the first application are executed by the reconfigurable hardware, followed by execution of the fourth one or more sections of the second application by the reconfigurable hardware.

9. The method of claim 1, wherein interleaving use of the reconfigurable hardware comprises:
first loading a first configuration file of the first application in a local memory of the reconfigurable hardware from an off-chip memory, where the off-chip memory and the reconfigurable hardware are respectively in two different integrated circuit chips;
subsequent to the first loading, first executing at least part of the first configuration file of the first application by a reconfigurable processor of the reconfigurable hardware;
while performing the first executing, receiving a switch command to switch usage of the reconfigurable processor of the reconfigurable hardware from the first application to the second application;
in response to the switch command, invalidating the first configuration file loaded in the local memory;
subsequent to the invalidating, loading a second configuration file of the second application in the local memory of the reconfigurable hardware; and
second executing at least part of the second configuration file of the second application by the reconfigurable processor of the reconfigurable hardware.

10. The method of claim 1, wherein interleaving use of the reconfigurable hardware comprises:
loading a first configuration file of the first application and a second configuration file of the first application in a local memory of the reconfigurable hardware from an off-chip memory, where the off-chip memory and the reconfigurable hardware are in two different integrated circuit chips;
loading the first configuration file of the first application from the local memory of the reconfigurable hardware to a reconfigurable processor of the reconfigurable hardware;
executing at least part of the first configuration file of the first application by the reconfigurable processor of the reconfigurable hardware;
while executing at least part of the first configuration file, receiving a switch command to switch usage of the reconfigurable processor of the reconfigurable hardware from the first application to the second application;
in response to the switch command, invalidating the first configuration file loaded in the reconfigurable processor;
subsequent to the invalidating, loading the second configuration file of the second application from the local memory of the reconfigurable hardware to the reconfigurable processor of the reconfigurable hardware; and
executing at least part of the second configuration file of the second application by the reconfigurable processor of the reconfigurable hardware.

11. The method of claim 1, wherein interleaving use of the reconfigurable hardware comprises:
simultaneously loading a first configuration file of the first application and a second configuration file of the first application in a local memory of the reconfigurable hardware;
loading the first configuration file of the first application from the local memory of the reconfigurable hardware to a reconfigurable processor of the reconfigurable hardware;
executing at least part of the first configuration file of the first application by the reconfigurable processor of the reconfigurable hardware;
while executing at least part of the first configuration file, receiving a switch command to switch usage of the reconfigurable processor of the reconfigurable hardware from the first application to the second application;
in response to the switch command, loading the second configuration file of the second application from the local memory of the reconfigurable hardware to the reconfigurable processor of the reconfigurable hardware; and
executing at least part of the second configuration file of the second application by the reconfigurable processor of the reconfigurable hardware.

12. The method of claim 1, wherein interleaving use of the reconfigurable hardware comprises:
simultaneously loading a first configuration file of the first application and a second configuration file of the second application in a first buffer and a second buffer, respectively, within a reconfigurable processor of the reconfigurable hardware;
during a first execution phase, outputting, via a multiplexer, the first configuration file of the first application from the first buffer, and executing the first configuration file of the first application by the reconfigurable processor;
at an end of the first execution phase, receiving a switch command to switch usage of the reconfigurable processor of the reconfigurable hardware from the first application to the second application; and
in response to the switch command and during a second execution phase, outputting, via the multiplexer, the second configuration file of the second application from the second buffer, and executing the second configuration file of the second application by the reconfigurable processor.

13. The method of claim 1, further comprising:
compiling a first dataflow graph associated with the first application, to generate the first execution file that includes (i) a first plurality of configuration files to be executed by the reconfigurable hardware and (ii) a first plurality of host execution files to be executed by the general hardware; and
compiling a second dataflow graph associated with the second application, to generate the second execution file that includes (i) a second plurality of configuration files to be executed by the reconfigurable hardware and (ii) a second plurality of host execution files to be executed by the general hardware.

14. The method of claim 13, further comprising:
while compiling to generate the first execution file, defining a plurality of switching points within the first plurality of configuration files,
wherein a first switching point is between two consecutive configuration files, and wherein a second switching point is within a configuration file, and wherein usage of the reconfigurable hardware is switched from or to the first application at one or more switching points of the plurality of switching points.

15. The method of claim 14, wherein the reconfigurable hardware is to synchronize data with an off-chip memory at a switching point, irrespective of whether a switching of the reconfigurable hardware from or to the first application occurs at the switching point, and wherein the off-chip memory and the reconfigurable hardware are respectively within two different integrated circuit chips.

16. The method of claim 1, wherein interleaving use of the reconfigurable hardware further comprises:
   interleaving use of the reconfigurable hardware, further taking into account a state of one or both the first application and the second application; and
   dynamically updating the interleaved use of the reconfigurable hardware, in response to a change in state of at least one of the first application and the second application,
   wherein each of the first and second application is, at a specific time, in a respective one of a ready state, a waiting state, or a blocked state.

17. The method of claim 1, wherein the first priority indicator comprises a first latency sensitivity associated with the first application, and wherein the second priority indicator comprises a second latency sensitivity associated with the second application.

18. The method of claim 17, wherein the first latency sensitivity associated with the first application provides an indication of a first target maximum latency for the first application, and wherein the second latency sensitivity associated with the second application provides an indication of a second target maximum latency for the second application.

19. The method of claim 1, wherein the first priority indicator comprises a first target Quality of Service (QoS) identifier associated with the first application, and wherein the second priority indicator comprises a second target Quality of Service (QoS) identifier associated with the second application.

20. The method of claim 1, wherein the first priority indicator comprises a first deadline timestamp by which execution of the first application is to be targeted to be completed.

21. The method of claim 1, wherein using the general hardware by either the first one or the second one of the first and second applications comprises:
   when the reconfigurable hardware is used by the first application, using the general hardware by the first application, such that a section of the first application is executed by the reconfigurable hardware in parallel with execution of another section of the first application by the general hardware.

22. The method of claim 1, wherein using the general hardware by either the first one or the second one of the first and second applications comprises:
   when the reconfigurable hardware is used by the first application, using the general hardware by the second application, such that a section of the first application is executed by the reconfigurable hardware in parallel with execution of a section of the second application by the general hardware.

* * * * *